United States Patent
Hajash et al.

(10) Patent No.: US 12,067,780 B2
(45) Date of Patent: Aug. 20, 2024

(54) SYSTEMS AND METHODS FOR VIDEO EVENT SEGMENTATION DERIVED FROM SIMULTANEOUSLY RECORDED SENSOR DATA

(71) Applicant: Samsung Electronics Company, Ltd., Gyeonggi-do (KR)

(72) Inventors: Kathleen Sofia Hajash, Sunnyvale, CA (US); Thomas Brenner, Sunnyvale, CA (US); Brian Harms, San Jose, CA (US); Catherine S. Kim, San Jose, CA (US); Imran Mohammed, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 17/683,142

(22) Filed: Feb. 28, 2022

(65) Prior Publication Data
US 2023/0274549 A1    Aug. 31, 2023

(51) Int. Cl.
*G06V 20/40*       (2022.01)
(52) U.S. Cl.
CPC .............. *G06V 20/49* (2022.01); *G06V 20/41* (2022.01); *G06V 20/44* (2022.01)
(58) Field of Classification Search
None
See application file for complete search history.

(56) References Cited

U.S. PATENT DOCUMENTS

| | | | |
|---|---|---|---|
| 8,929,709 B2* | 1/2015 | Lokshin | H04N 5/77 |
| | | | 386/227 |
| 9,456,781 B2 | 10/2016 | Balakrishnan et al. | |
| 10,740,620 B2 | 8/2020 | Vijayanarasimhan et al. | |
| 10,923,157 B2 | 2/2021 | Hendry et al. | |
| 11,019,253 B1* | 5/2021 | Weber | H04N 23/64 |
| 2013/0346013 A1* | 12/2013 | Lokshin | A61B 5/7264 |
| | | | 702/141 |
| 2014/0375817 A1 | 12/2014 | Meschter | |
| 2014/0376876 A1* | 12/2014 | Bentley | G06V 40/23 |
| | | | 386/227 |
| 2016/0027470 A1 | 1/2016 | Newman | |
| 2016/0365114 A1 | 12/2016 | Galant et al. | |

(Continued)

OTHER PUBLICATIONS

International Search Report and Written Opinion in Application No. PCT/KR2023/001407.

*Primary Examiner* — Heather R Jones

(57) ABSTRACT

In one embodiment, a method includes, by an electronic device, accessing activity data containing one or more non-image-based sensor signals from a first wearable device, where the activity data corresponds to an activity a user performs during a first timeframe, accessing from a first camera device, one or more cameras of the first camera device, where the video data corresponds to the first activity of the first user during the first timeframe, segmenting the activity data based on one or more features of the one or more non-image-based sensor signals to identify one or more segments of activity data corresponding to a second timeframe, classifying the one or more segments of the video data based on the one or more identified events associated with the first activity during the second timeframe, classifying the segments of the video data based on the one or more events during the second timeframe.

20 Claims, 21 Drawing Sheets

(56) References Cited

U.S. PATENT DOCUMENTS

| | | |
|---|---|---|
| 2017/0118539 A1* | 4/2017 | Lokshin .............. G11B 27/031 |
| 2018/0301169 A1 | 10/2018 | Ricciardi |
| 2020/0137348 A1 | 4/2020 | Burke |
| 2021/0104264 A1 | 4/2021 | Bose et al. |
| 2021/0400201 A1 | 12/2021 | Schwartz |
| 2022/0028521 A1 | 1/2022 | Burroughs |

* cited by examiner

SYSTEMS AND METHODS FOR VIDEO EVENT SEGMENTATION DERIVED FROM SIMULTANEOUSLY RECORDED SENSOR DATA

TECHNICAL FIELD

This disclosure relates generally to database and file management within network environments, and in particular relates to digital video processing.

BACKGROUND

As video recording devices become increasingly portable and durable, users are enabled to capture video footage in a wide variety of settings. One of the most significant challenges content creators face is that editing footage is an arduous and tedious task that requires sifting through large amounts of digital footage. This issue becomes linearly more cumbersome with an increase in the length or amount of footage to sort through. Thus, it may be useful to provide techniques for reducing the amount of time a user is required to spend searching through video footage.

DESCRIPTION OF EXAMPLE EMBODIMENTS

Figure 1:
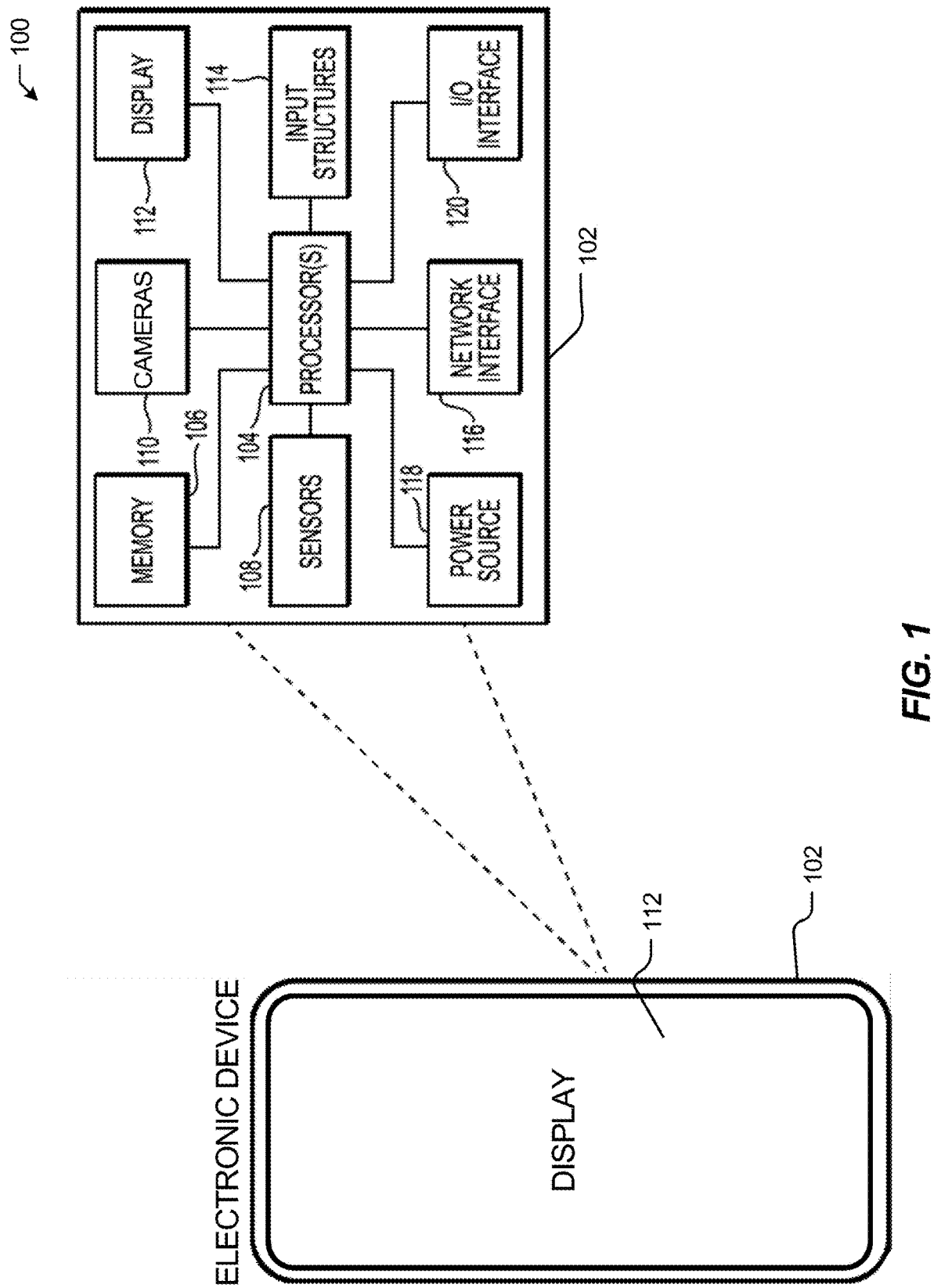
FIG. 1 illustrates an example diagram of a mobile client system.

FIG. 1 illustrates an example electronic device 100. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors (e.g. accelerometer, gyroscope), position sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

In particular embodiments, the electronic device 100 may be used as a recording device. As used herein, "recording device" may refer to a video recording device which is intended to view and record an activity for later playback. In particular embodiments, the electronic device 100 may be used as a primary device. As used herein, "primary device" may refer to a device used as the central device to which all other devices are connected. Further, the primary device and may perform data collection of the activity and provide activity footage for later playback. It is understood that the primary device may also be the "primary recording device" and/or the "primary video recording device" in addition to being the central device to which all other devices are connected. As used herein, "primary video/data recording device" may refer to a primary device that may record both video and sensor data. In particular embodiments, the primary video recording device may include any of various personal electronic devices 102, such as a mobile phone electronic device, a tablet computer electronic device, an action camera electronic device, a drone electronic device, and so forth. As video recording devices are becoming increasingly portable and able to withstand a variety of conditions, users are enabled to record video footage while performing a wide range of activities (e.g., skiing, swimming, biking). Certain technical challenges exist when it comes to reviewing video footage. For example, when a user takes a video of an activity in which they or others participate in, and then want to review, edit, and share the footage, the amount of footage to sort through may be cumbersome. For example, if a user's goal is to take five hours of footage of an activity recorded throughout the day, and edit it down to a five-minute video, it may be difficult to search through the entirety of the footage to identify clips of interest, especially on a mobile device. Similarly, if multiple takes of a similar shot are recorded, the user may be faced with the challenge of determining which clip best represents the event the user intended to capture and requires the user to re-watch the entirety of the footage to locate to identify the specific moments they wish to review and/or share. Further, the user may know exactly which event in the footage they are looking for but have no indication of where in the video they may find that moment. These moments may be like digital needles in a video haystack, and the larger the haystack, the harder the problem becomes. The solution presented by the embodiments disclosed herein to address this challenge may be to provide a platform to automatically segment and classify events within the footage through the use of simultaneously recorded non-image based sensor data. As used herein, "non-image based sensor data" refers to one or more dimensional data produced by a sensor 108 at any given time. As an example and not by way of limitation, non-image based sensor data may include sensors such as an accelerometer or gyroscope, but does not include image-based sensors such as an RGB or RGB-D camera.

Provided that the personal electronic device 102 contains the requisite technology to record and store video, perform computational tasks, record the time, and record sensor data, the personal electronic device 102 may be utilized by the present platform as the primary recording device, where data from any or all available sensors 108 may be synchronized and recorded for later use. In particular embodiments, the primary recording device may contain one or more sensors 108, including but not limited to an accelerometer, gyroscope, ambient light sensor, magnetometer, pressure sensor, global positioning system (GPS), and so forth. In the case that the primary recording device is the only device being utilized by the user (i.e., no wearable sensor recording device is present), the primary recording device must contain one or more sensors 108 in addition to video recording capabilities. In particular embodiments, if the primary recording device contains capabilities to record time accurately, the present platform may utilize a timestamp to synchronize recorded video with recorded sensor data. If the recording device does not contain capabilities to record time accurately, the present platform may achieve temporal data and video correlation via other methods, as disclosed herein.

In particular embodiments, when the user is wearing a wearable sensor recording device, the primary recording device may not need to contain any additional sensors 108. As used herein, "wearable sensor recording device" may refer to an electronic device 100 that contains at least a battery, one or more sensors 108, time recording capabilities (e.g., a clock), internal storage/memory 106, and wireless connectivity through a network interface 116 to the primary video recording device. It is understood that the wearable sensor recording device may be used in addition to the primary recording device. As an example and not by way of limitation, the wearable sensor recording device may be communicatively coupled to the primary video recording device with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of the forementioned. In the case that the wearable sensor recording device is out of a wireless connectivity range of the primary video recording device, the sensor data from the wearable sensor recording device may be locally stored on the wearable sensor recording device. As an example and not by way of limitation, when the wearable sensor recording device moves in and out of wireless range of the primary video recording device, the recorded sensor data may be streamed, logged, and transferred to the primary video recording device upon completion of the activity. As another example and not by way of limitation, the recorded sensor data may be streamed, logged, and transferred when the wearable sensor recording device is in range of the primary recording device, and stored locally when the wearable sensor recording device is out of range of the primary recording device. In particular embodiments, the present platform may be communicatively coupled to the primary video recording device and/or wearable sensor recording device by any number of network interfaces suitable for transmitting the electronic device 100 to access and receive data over one or more wired networks, wireless networks, cloud-based networks, and/or distributed networks.

Figure 2:
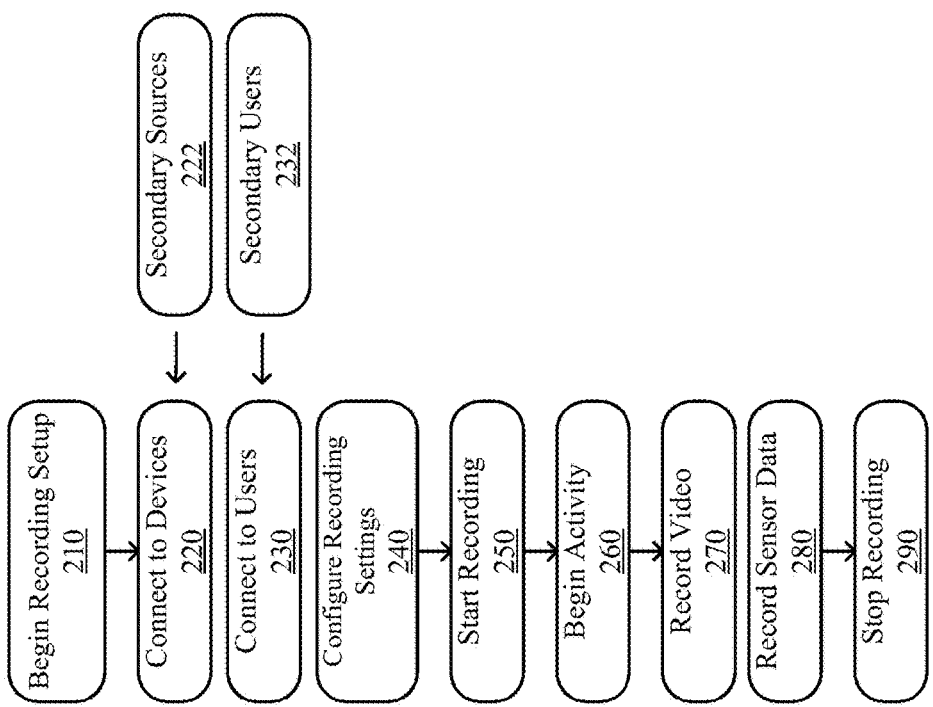
FIG. 2 illustrates an example workflow diagram depicting a technique for performing data collection for video event segmentation.

FIG. 2 illustrates an example workflow diagram 200 depicting a technique for performing data collection 202 for video event segmentation. In particular embodiments, data collection 202 may be performed by one or more electronic devices 100 during a specific activity. As used herein, "specific activity" may refer to the activity the user and/or present platform has identified the user as performing. Identification of the specific activity is important for the present platform to identify specific actions within the activity. In particular embodiments, a default or general activity may be automatically selected when the user and/or present platform have not identified an activity, or when the activity being performed does not fit into a predefined category. As used herein, "specific action" or "specific event" may refer to an action reasonably expected to take place within an activity. For example, shooting a basketball may be a specific action a user may perform within the activity of playing basketball. When the activity to be performed is known by the present platform, the present platform may determine that said activity does not require data from one or more sensors 108, or alternatively, determine that said activity requires data from all sensors 108.

In particular embodiments, the first step in data collection 202 may be to begin the recording setup, as in step 210, on one or more electronic device(s) 100. As an example and not by way of limitation, the user, using one or more electronic device(s) (e.g., primary video recording device), may configure and initiate a recording. The recording may be comprised of a single video, a plurality of videos, and/or other sensor data collected by the primary video recording device and a one or more secondary devices. The setup process of step 210 may include steps such as selecting video settings, selecting the type of activity to be recorded, and/or connecting the primary recording device to one or more secondary sources 222 and/or secondary users 232, as in steps 220 and 230. As used herein, "secondary sources" may refer to video and/or sensor recording devices in addition to the primary video recording device. A secondary source 222 may be, for example, a video recorded on the mobile device of a secondary user 232 also witnessing the activity. In this example, the video footage did not originate from the primary recording device, but may be temporally correlated with the activity being recorded by the primary video recording device, which may allow the present platform to present the video for segmentation and clip generation. As an example and not by way of limitation, secondary sources 222 may include personal electronic device 102 inputs, action camera inputs (such as an image sensor, audio inputs, etc.), wearable device inputs (such as global positioning system (GPS) sensors, accelerometers, speedometers, altimeters, gyroscopes, magnetometers, etc.), and/or wearable fitness sensor inputs (blood pressure sensors, heart rate sensor, blood oxygen sensor, etc.).

As used herein, "clips" refer to segments of recorded video as events and the associated time window corresponding to the event. As an example and not by way of limitation, the time windows may contain a list of start and stop times corresponding to when the event occurred. As another example and not by way of limitation, when a filter is selected by a user in the user interface (UI), the present platform may display video clips using the associated time window for the specified action and/or event. The primary and/or secondary sources 222 performing recordings may record video, as in step 270 and/or sensor data, as in step 280. As an example and not by way of limitation, the one or more devices performing video capture may be equipped with an optical camera or other form of visual recording device (Red Green Blue (RGB) camera, Red Green Blue-Depth (RGB-D) camera, lidar, etc.). Video and/or sensor data captured by one or more secondary sources 222 may be shared with the primary device and/or present platform during or after the activity, as in step 220. As an example and not by way of limitation, sensor data of secondary sources 222 may be shared by means of a wired network, wireless network, cellular network, cloud-based network (e.g., a cloud based service that may service hundreds or thousands of electronic devices 100), and/or an suitable data sharing method.

In particular embodiments, the user may configure recording settings in step 240. As an example and not by way of limitation, the present platform may prompt the user to configure recording settings by selecting the type of activity to be recorded from a plurality of activities. In particular embodiments, after a user has configured the recording setting in step 240, the user may initiate a recording on the primary video recording device, wearable sensor recording device, and/or secondary devices 222 at step 250, and begin performing the activity at step 260. In particular embodiments, the user may start recording video using a primary recording device with the option to use N number of additional recording devices to record activity, as in step 270. In particular embodiments, during the video recording of step 270, sensor data may be recorded by the primary video recording device, wearable sensor recording device, and/or secondary device(s) 222 in a synchronized fashion, as in step 280. As an example and not by way of limitation, video of the activity may be taken from any point of view, including but not limited to the viewpoint of the user, bystanders, or remote platforms such as a drone. In this example, some aspects of video recordings may be continuous while others may be a subset of the entire activity. Sensor data may be collected from any point of view, however, data which is not generated through actions taken by the user may not be useful. In this example, sensors 108 of the primary video recording device, wearable sensor recording device, and/or secondary device(s) 222 may record data for the entirety of the activity, while several videos are taken. The user may stop the recording, as in step 290, at any time during or after the activity. Upon suspension of recording the activity, video data and sensor data may be aggregated and time correlated for further processing.

Figure 3:
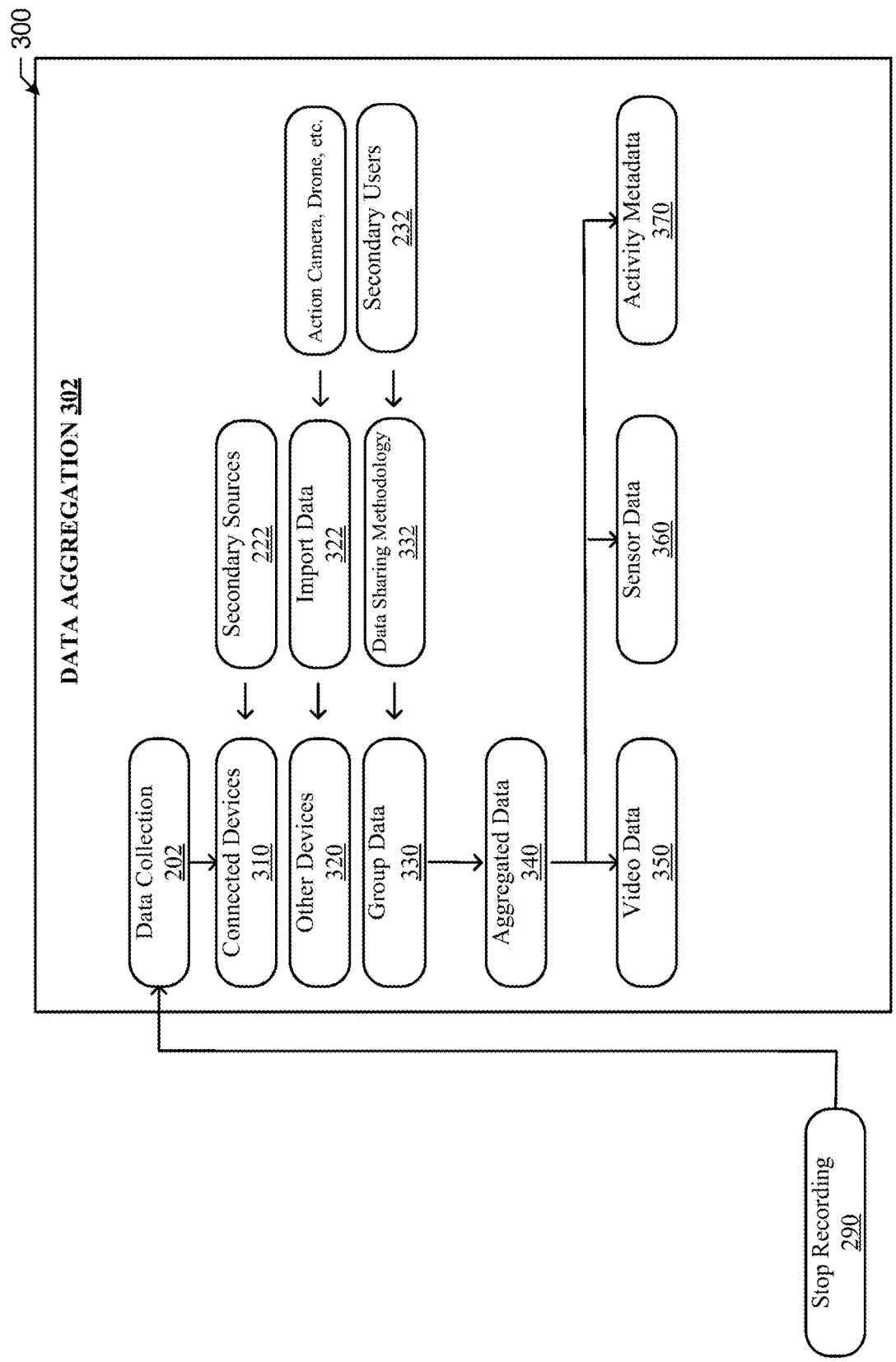
FIG. 3 illustrates an example workflow diagram depicting a technique for performing data aggregation for video event segmentation using non-image-based signals.

FIG. 3 illustrates an example workflow diagram 300 depicting a technique for performing data aggregation 302 for video event segmentation using non-image-based signals. In particular embodiments, at the conclusion of a recording, as in step 290, the present platform may perform data collection 202 by collecting recorded data from connected devices 310, secondary devices 222, and other devices 320 that were not previously connected to the platform. In particular embodiments, a user may import data from other devices at step 320. As an example and not by way of limitation, a user may share data through a predefined user group, such as a friends network, and/or by detecting users within a proximity of the primary video recording device. Once secondary users 232 are detected and a data sharing methodology 332 is selected, all data may be aggregated in step 340. In this example, secondary users 232 may transmit all video data 350, or alternatively, only transfer video data 350 relevant to each user. For example, secondary users 232 may be prompted to only transmit video data 350 in which the user appears and/or only transmit video data 350 from when the users were in close proximity.

In particular embodiments, the sensor data 360, video data 350, and activity metadata 370 from disparate sources may be automatically and/or manually aggregated onto the electronic device 100, where the sensor data 360 and video data 350 may be automatically time aligned through one or more methods. In particular embodiments, the activity data and the video data 350 may be aligned based on one or more timestamps, audio elements, visual elements, or sensor signal elements. As an example and not by way of limitation, a user may manually import sensor data 360 and/or video data 350 from any additional device that does not maintain an automatic connection to the primary video recording device.

In particular embodiments, upon conclusion of data aggregation as in step 340, the present platform may time correlate all of the individual data recordings. As an example and not by way of limitation, the time alignment may be performed in later steps such as by data processor 402. As another example and not by way of limitation, video data 350 and sensor data 360 may be inherently correlated due to being synchronously recorded by the primary video recording device. In particular embodiments, video data 350 and/or sensor data 360 from one or more disconnected secondary device(s) 222 may be transmitted to the present platform and time correlated to the primary video recording device in step 340. In particular embodiments, upon the conclusion of data aggregation and time alignment, the present platform may extract and aggregate metadata from all of the data sources into one or more activity metadata files. For example, the activity metadata 370 may include high-level activity information gathered by the primary recording device, such as the activity type, a timestamp corresponding to the start of the activity, geolocation, etc. Activity metadata 370 may also include information about additional sensor or video data sources, including but not limited to starting timestamps of recordings, the location of a sensor (e.g., chest, helmet, wrist, etc.), sensor type (e.g., camera model or wearable model), and/or sensor name.

Figure 4:
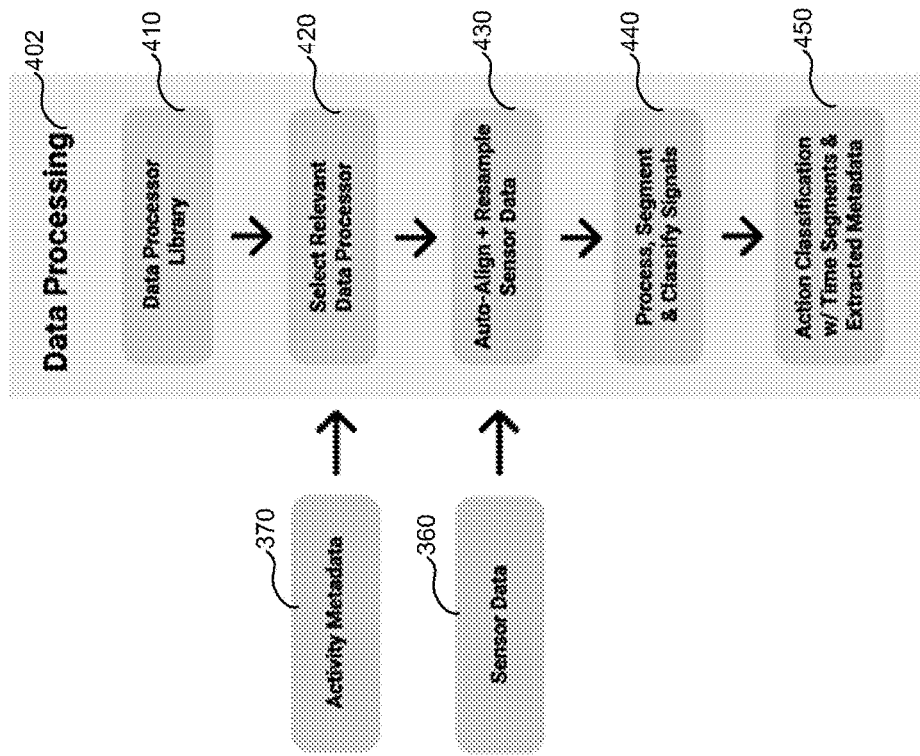
FIG. 4 illustrates an example workflow diagram depicting a technique for performing data processing for video event segmentation using non-image-based signals.

FIG. 4 illustrates an example workflow diagram 400 depicting a technique for performing data processing 402 for video event segmentation using non-image-based signals. In particular embodiments, data processing 402 may begin at step 410, by the electronic device 100 instructing one or more processors 104 to access one or more data processor libraries stored either locally in memory 106 of the electronic device 100, or remotely over one or more cloud-based networks and/or distributed networks. Each data processor in the data processor library 401 may be developed by engineers prior to deployment to the user. In particular embodiments, preprocessing steps, normalization, classification models, etc. may be predetermined based on the data processor selected for the specific activity. Activity metadata 370, such as activity type, may be received by the present platform, wherein the present platform may select a relevant data processor 420 for processing sensor data 360 and activity metadata 370 at step 440. In particular embodiments, at step 430, if auto-alignment has not already been performed during data aggregation, the present platform may perform time alignment for any sensor or video data provided. To align the video data with sensor data 360, the present platform may use the metadata of each video recording in the activity metadata 370, or, in the case where video metadata is not provided, the platform may extract metadata from each of the video recordings. After the data is time-aligned, the data processor may resample the sensor data by interpolating, up sampling, or down sampling in order to generate evenly spaced data samples. In particular embodiments, at step 440, the present platform may process, segment, and classify signals of input sensor data 360, and further use the activity metadata 370 as supplemental information during the processing.

In particular embodiments, in step 420, the data processor may be selected from the library of data processors 410 by the activity metadata 370, such as the activity type. If no activity type is specified, the present platform may either select a default data processor that is activity-agnostic, or it may perform activity recognition over the entire recording in order to select an activity type. In particular embodiments, this specification enables the relevant data processor 420 to process the sensor data 360 in either an-activity specific modality, or an activity-agnostic modality. As an example and not by way of limitation, when the present platform has identified the activity type of the activity being filmed, the sensor data 360 recorded may be processed by the relevant data processor 420 in an activity-specific way. For example, the user interface of the present platform may present the user an option to classify all or a subset of recorded sensor data 360 by selecting the specific activity (i.e., the activity type) the user intends to perform. In this example, a user may select "basketball" prior to initiating the activity of playing basketball, or alternatively, select "basketball" after completely of the activity and all sensor data 360 has been recorded.

In particular embodiments, when the activity type is not available, the present platform may instruct one or more algorithms executed by one or more processor(s) 104 to extract activity metadata 370 such as activity type for the purpose of selecting a relevant data processor. In this example, one or more algorithms may be executed by one or more processor(s) 104 of electronic device 100 that may automatically detect the activity type or other activity metadata 370 in step 420 prior to selecting the relevant data processor. As another example and not by way of limitation, when the present platform is not instructed by a user as to what activity is being recorded and the present platform uses a default data processor the data may be processed in a generalized approach to identify peak detection, high variance in specific sensors, or other approach of identifying actions of interest without making assumptions about what action the data represents.

In particular embodiments, if time alignment has not been performing during the data aggregation 302 step, the present platform may perform temporal data and video correlation in step 430. As used herein, "temporal data and video correlation" may refer to the method of temporally correlating sensor data 360 and/or video data 350 from one or more secondary sources 222 with sensor data 360 and/or video data 350 from the primary recording device through the use of one or more timestamps associated with the video data 350. In particular embodiments, a timestamp associated with one or more secondary sources 222 and/or video from the primary recording device may not be available, or accurate. In this example, the present platform may temporally correlate the video data by comparing audio signals and identifying features in the audio signal to automatically temporally align the footage. For example, a video recording recorded by a drone without an internal clock may be loaded into the platform by a user to be aligned with a video recording from the primary video recording device. If both video recordings contain audio, the present platform may align the audio by identifying features within the audio. As an example, if both videos captured audio of a person screaming, one at ten seconds into the video recording, and another at thirty seconds into the video recording, the video platform may determine through the similarity of audio signal features that the second video may need to be shifted in time by twenty seconds for the video recordings to be aligned. In another example, we can auto-align signals from sensors on multiple devices by requiring the user to move both devices together to create a peak in the accelerometer. This signal can then be used to auto-align the sensor data from two devices, such as a wearable and a mobile device. In particular embodiments, the sensor data may have irregular sample rates and may not align between different sensors from the same or different devices. It may be necessary to resample the aligned sensor data to a uniform sample rate. This may be performed in a number of ways which may include interpolation, down sampling, up sampling, etc.

In particular embodiments, the present platform may perform event segmentation in step 440. As used herein, "video event segmentation" may refer to performing event segmentation using non-image-based sensor signals and applying those segments to a video timeline. In particular embodiments, one or more data processors may process the aligned and resampled sensor data, perform segmentation and classification, and output the event classes and their associated time windows. The output event classes may correspond to action filters that a user may use to search through video data 350. In particular embodiments, the action (i.e. event) being performed may be determined from a plurality of actions based on one or more non-image based sensor signals of the sensor data 360. As an example and not by way of limitation, the actions may be further determined by the present platform based on one or more of a global positioning system (GPS) location, a date, a time, a temperature, accelerometer data, gyroscope data, pressure data, or a previous activity performed by the user. In particular embodiments, the data processor may then return the action and/or event classes with the associated time segments as well as any extracted metadata and statistics about the activity in step 440.

Figure 5:
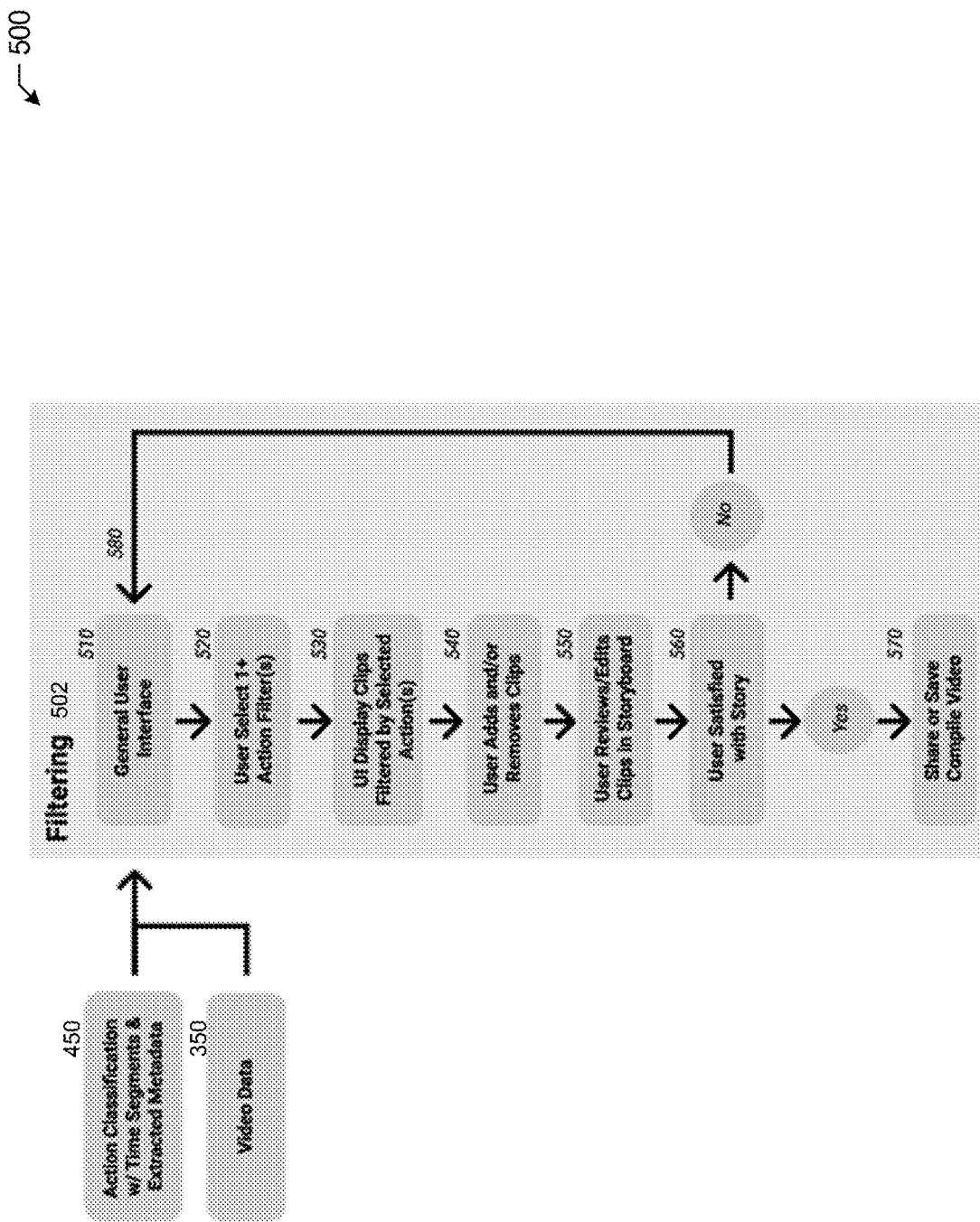
FIG. 5 illustrates an example workflow diagram depicting a technique for performing filtering for video event segmentation using non-image-based signals.

FIG. 5 illustrates an example workflow diagram 500 depicting a technique for performing filtering 502 for video event segmentation using non-image-based signals. In particular embodiments, the present platform may perform filtering 502 by importing the classified actions (i.e., event classes) and time segments produced at step 450 and applying the time segments to the corresponding video data 350 to be utilized by a general user interface (UI) for display on electronic device 100 in step 510. As used herein, "user interface" (UI) may refer to the computer-generated graphical user interfaces of the present platform. In particular embodiments, during data collection 202, the user interface of the present platform may present the user an option to start recording 250 and/or suspend the recording 290 of video data 350 as well as all relevant sensor data 360. In particular embodiments, upon initial opening of an activity, the general UI 510 may display one or more videos in full length with multiple filter options. In this example, the filters may correspond to one or more of the actions (i.e., event classes) that were generated in step 450. In particular embodiments, the user may select one or more actions to filter video data 350, as in step 520. As an example and not by way of limitation, if the user performed the activity of playing basketball, the user may select a specific action of "taking a shot." In this example, the general UI 510 may then display video clips of the user performing the specific action of "taking a shot." The segmentation and classification of sensor data 360 allows the user to easily retrieve one or more clips of the user performing specific actions from the full video recording within the present platform for future use.

In particular embodiments, at step 530, the present platform may instruct the general user interface 510 to display clips filtered by selected actions. As an example and not by way of limitation, the user may select or deselect video clips from the clips that were filtered in step 530 that contain the user specified action(s).

In particular embodiments, at step 540, the user may add and/or remove clips from the general UI 510. At step 550, the user may select particular video clips to add to a storyboard, wherein the user may review and/or edit the clips in the storyboard. In particular embodiments, the present platform may use one or more algorithms to recommend clips for the user's storyboard. For example, the present platform may recommend a highlight reel of clips selected by a recommendation algorithm or any other method. As used herein, "storyboard" may to refer to a collection of clips that the user may review, this collection of clips may have been selected by the user by filtering the clips by selected actions or may be auto-generated by the present platform. At step 550, in the storyboard UI, the user may add to or subtract video clips from the storyboard, review the clips one by one, edit the clips (for example, by extending the time bounds of the clips, applying visual filters, etc.), rearrange the clips relative to one another, export the individual clips to individual files to be stored and/or shared, and/or export a single video comprising all of the clips present in the storyboard. For example, a user may want to compile all of the clips in which the user performed a jump while skiing. While reviewing videos in the UI of the present platform, the user may apply the "jump" action filter, in which all the clips containing jumps may be presented to the user. The user may select the clips one by one or choose to select a "select all" option in which all clips are selected. The user may then select the "add to Storyboard" option in the UI. The user may then navigate to the Storyboard screen, where the user is permitted to edit the individual clips before finalizing a video output. The user may then be presented an option to generate a single video from the Storyboard, in which the present platform may generate a single video file for local storage or sharing with other devices, users, and applications.

In particular embodiments, the user may determine if they are satisfied with the story at step 560. As an example and not by way of limitation, if the user is satisfied with the story at step 560, the user may share or save the compiled video at step 570. As another example and not by way of limitation, if the user is not satisfied with the story at step 560, the user may return to the general user interface 510 and continue to add, remove, or edit clips from the Storyboard screen, or return to the general UI 510 and select one or more action filters, as in step 520, and continue through the workflow to add clips to the Storyboard.

Figure 6:
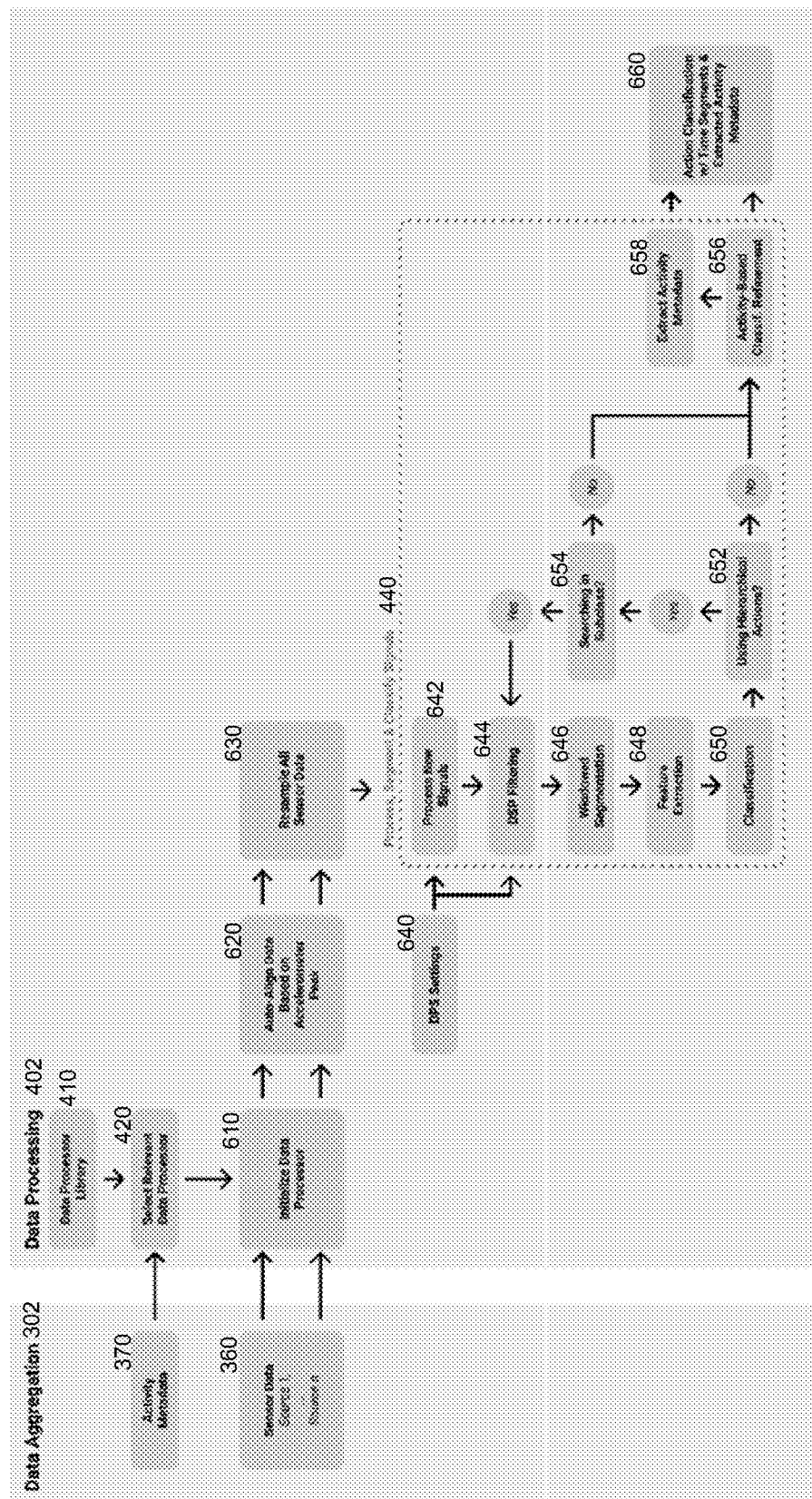
FIG. 6 illustrates an example workflow diagram depicting an example relationship between data aggregation, data processing, and the data processing pipeline for video event segmentation using non-image-based signals.

FIG. 6 illustrates an example workflow diagram 600 depicting an example relationship between data aggregation 302, data processing 402, and the data processing pipeline for video event segmentation using non-image-based signals. In particular embodiments, data processing 402 may begin by the present platform searching through the data processor library 410 using activity metadata 370 to guide the selection. As an example and not by way of limitation, activity metadata 370, such as the type of activity, may be used to select the most relevant data processor, as in step 420.

In particular embodiments, at step 610, the present platform may retrieve sensor data 360 and initialize the data processor. As an example and not by way of limitation, at step 620, the present platform may auto-align sensor data 360 based on accelerometer peaks in the metadata. At step 630, the present platform may resample all sensor data 360 before beginning the process of processing, segmenting, and classifying signals. As an example and not by way of limitation, the activity type may be manually selected before the activity begins, after completion of the activity, or at any time during the activity. In particular embodiments, any time the activity type is changed, the selected data processor may process the signals to output the action filters and associated time segments. As an example and not by way of limitation, the present platform may also have a default or general activity which may be used when no activity type is selected by a user. In particular embodiments, the activity type may be automatically determined by an activity recognition algorithm utilizing sensor data 360 such as GPS location, data, time, temperature, previous activity types, accelerometer, or other sensor data 360.

In particular embodiments, after selection of the relevant data processor at step 420, the present platform may begin by retrieving sensor data 360 as input to initialize the data processor at step 620 before pre-processing the sensor data. If the data is not already time-aligned during the data aggregation step 302, the data processor may perform auto-alignment of the sensor data. As an example and not by way of limitation, the alignment in step 620 may be performed by using timestamps or through alignment of matching features such a peaks. After the data is time-aligned, all sensor data 360 may be resampled, as in step 630, to make sure that all samples are aligned with a constant sampling rate. This may be performed through any number of methods, some of which include interpolation, down sampling, up sampling, etc.

In particular embodiments, processing, segmenting, and classifying signals as in step 440 may begin by retrieving the aligned and resampled sensor data 360. In particular embodiments, the present platform may perform sensor fusion and process new signals, as in step 642. As an example and not by way of limitation, new signals may be processed by one or more data processors. In particular embodiments, the present platform may calculate and process new signals based off of available sensor data 360 produced by one or more sensors 108. For example, the present platform may calculate the speed of the user based on GPS signal data, pressure, and/or accelerometer data.

In particular embodiments, the present embodiment may perform digital signal processing (DSP) filtering at step 644 to smooth the data, remove and/or reduce noise, and isolate particular bands of the signal. DSP filtering, as in step 644, may be performed by the techniques of moving average, lowpass, high-pass, bandpass, Butterworth, Kalman, etc., to remove noise and isolate signals. Although this disclosure describes the previously discussed techniques to perform DSP, this disclosure contemplates any suitable method of digital signal processing. It is understood that the digital signal processing may be performed in the time or frequency domain.

Next, the present platform may extract sliding window segments of signals from sensor data 360, as in step 646 and extract features from each segment as in step 648. As an example and not by way of limitation, windowed segmentation 646 may involve capturing sequential segments of the signal by positioning a sliding window corresponding to a specific time range across the signal. In particular embodiments, the sliding window may or may not overlap with one or more other sliding windows.

In particular embodiments, the present platform may perform feature extraction as in step 648. Feature extraction as in step 648 may be performed by extracting features from each of the segments produced by window segmentation in step 646. As an example and not by way of limitation, features may be extracted in the time domain and/or frequency domain. For example, time domain features may include one or more of mean, variance, standard deviation, Root Mean Square (RMS), minimum values, maximum values, amplitude, and/or correlation. Frequency domain features may include one or more of energy, power, centroid, entropy, DC components, peak, and/or coefficient sum.

Although unlisted in FIG. 6, dimensionality reduction may be performed in any embodiment in which machine learning or deep learning may be employed. As an example and not by way of limitation, dimensionality reduction may be performed after feature extraction and prior to classification in the process of processing, segmenting, and classifying signals by using one or more algorithms such as principal component analysis (PCA), kernel discriminant analysis (KDA), linear discriminant analysis (LDA), Autoencoder, or any suitable algorithm.

In particular embodiments, the present platform may perform classification in step 650 using the features extracted in step 648 as input. Any of the following methods and/or models may be trained and tuned prior to deployment by developers and/or engineers. As an example and not by way of limitation, the classes main contain both overlapping and non-overlapping classes. For example, one or more classes may be a subset of other classes. As an example and not by way of limitation, classification may be performed by a Classical Supervised Machine Learning model trained by shallow methods such as k-nearest neighbors (K-NN), support-vector machines (SVM), Decision Trees, and/or Naïve Bayes. In this example, the present platform may input extracted features into the classification model step 650 where the model may classify and output an action class corresponding to the features in each time window. As another example and not by way of limitation, the present platform may use a Semi-Supervised Machine Learning approach. This method may be used when the platform identifies a limited amount of labelled sensor data 360, but a significant amount of unlabeled sensor data 360. In this example, the engineer may utilize unsupervised clustering methods such as K-Means Clustering, Hierarchical Clustering, Gaussian Mixture Model (GMM), and any other suitable method to cluster similar samples close to one another. The present platform may review representative samples (e.g., the sample closest to the cluster's centroid), and if it doesn't have a label, review the corresponding video clip to determine a class for the clip, label the data with the class, and then propagate the label to all other samples in the cluster. Following this labelling process, the present platform may utilize any classical supervised machine learning approach as previously discussed. As another example and not by way of limitation, the engineer may use a Deep Learning approach, such as LSTM, Stacked Autoencoder, CNN, etc. A deep learning model may take raw data, smooth/filtered data, or extracted features as input and output the class label. As another example and not by way of limitation, the engineer may use Statistical Methods such as dynamic time warping or correlation between signals. In addition, the present platform my use unsupervised clustering methods such as K-Means Clustering, Hierarchical Clustering, and Gaussian Mixture Model (GMM) to cluster similar samples close to one another. The platform may then analyze the clusters and study statistical similarities between the features, and as a result, generate rules for classifying data.

In particular embodiments, after the present platform performs classification, as in step 650, the platform may check the configuration of the data processor for the specific activity to determine if it utilizes hierarchical actions, at step 652. Hierarchical actions may be predetermined by the engineers and are dependent upon the activity type and the selected relevant data processor. As an example and not by way of limitation, hierarchical actions may be used to describe an activity that contains classes (actions or events), which also contain subclasses (actions or event that only take place within the superclass). As an example, if a user engages in a game of basketball, the present platform might perform a first iteration, where the algorithm segments and classifies "playing" versus "not playing." In this example, playing and not playing basketball may be considered superclasses or super actions. Further, the platform may perform a second iteration, in which the algorithm evaluated the "playing" class for sub-classes of actions, such as a user taking a shot, dribbling, or passing. As another example and not by way of limitation, in other activities such as tennis, where the downtime is limited, the present platform may determine it is inefficient and unnecessary to perform two iterations to separate super-classes and sub-classes. In this example, the present platform may perform only one iteration to extract actions and associated time segments.

In particular embodiments, the selected data processor may determine whether hierarchical actions are being used in step 652. In response to determining that hierarchical actions are not being used, the present platform may continue to step 656 of refining the activity-based labels to output by one or more classification models. In response to determining that hierarchical actions are being used in step 652, the data processor may determine to search in a subclass, as in step 654. In particular embodiments, the hierarchical actions in step 652 maybe predetermined in a configuration file, or in data processor settings, and may contain one or more hierarchical levels. In this example, the data processor may read which actions or classes need to be classified in each hierarchical level. In particular embodiments, in response to the present platform performing a search in a subclass, as in step 654, the platform may re-execute digital signal processing (DSP) filtering as in step 644, windowed segmentation as in step 646, feature extraction as in step 648, and perform classification at 650, as the subclasses may require different parameters or models for these steps. As another example and not by way of limitation, if the present platform does not search in a subclass at step 654, the platform may continue to step 656 of refining the activity-based label outputs by one or more classification models.

In particular embodiments, after the present platform has processed every hierarchical level specified by the selected data processor, the platform will proceed to refining the activity-based labels as in step 656. At this step, each sliding time window with their corresponding features may be assigned one or more labels. For each action classification that is present in the specific activity type, the present platform may identify all of the time windows when that action occurs and determine whether to keep the sample, merge it with others, or remove it from the selection. The present platform may also determine based on the specific activity type, data processor, and action class to add time before and/or after the event so that the user sees parts of the video before and after the event of interest. As an example and not by way of limitation, if the skiing data processor is looking at segments where the user was on a lift, the present platform may merge together lift classification that are close together and disregard small lift segments that are far away from others, determining that it may be misclassified. As another example, if the skiing data processor is looking at segments where the user was performing "jumps," it may add one or more seconds before or after the jump to make sure the clip includes the lead up to the jump as well as time after the landing. At step 658, the present platform may extract the activity metadata and store the activity metadata in memory 106 of electronic device 102. In particular embodiments, at step 680, the present platform may perform action classification with time segments and the extracted activity metadata from step 658.

Figure 7:
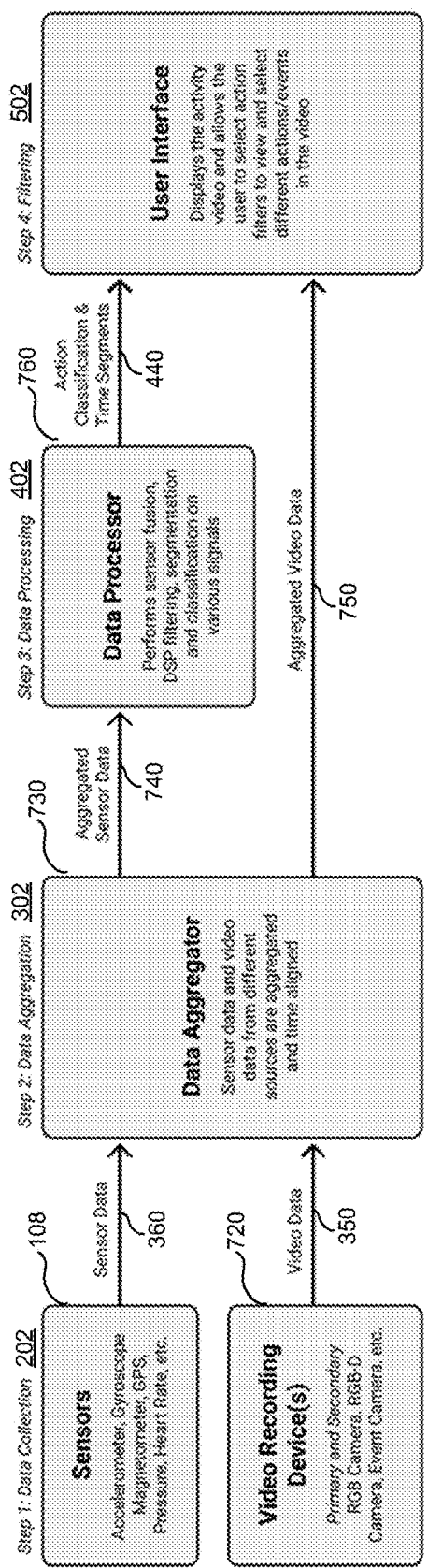
FIG. 7 illustrates a workflow diagram of the primary components of the video event segmentation process using non-image-based signals.

FIG. 7 illustrates a workflow diagram 700 of the primary components of the video event segmentation process using non-image-based signals. In particular embodiments, step one may be data collection 202 in which sensors 108 (accelerometer, gyroscope, magnetometer, GPS, blood pressure, heart rate, etc.) may collect sensor data 360 as input to a data aggregator 730 for data aggregation 302 at step two. Similarly, in step one, one or more video recording devices 720 (primary and secondary RGB camera, RGB-D camera, event camera, etc.) may collect video data 350 for input to a data aggregator 730 for data aggregation 302 in step two. The data aggregator 730 may aggregate and time align/time correlate sensor data 360 and video data 350 from multiple sources. In other embodiments, the time alignment may be performed by the data processor prior to performing sensor fusion and following steps. Without accurate time correlation between the sensor data 360 and video data 350, an individual data source may not be used to later classify and segment an individual video. Time correlation between independent data segments may be performed through several methods. These may range from using the time stamp associated with a particular segment of video data 350 and/or sensor data 360 to build a timeline of all consecutive and overlapping data segments. As an example and not by way of limitation, time alignment may be based on audio signals, visual detection of an event, or sensor signal analysis. Upon the completion of data aggregation 302 and correlation, aggregated sensor data 740 may be transmitted from data aggregator 730 to data processor 760, for data processing 402.

In particular embodiments, data processor 760 may perform the actions of sensor fusion, DSP filtering, and segmentation and classification on various signals of the aggregated sensor data 740. In particular embodiments, aggregated video data 750 may be output from the data aggregator 730 into the user interface 770 of the present platform for filtering 502. In particular embodiments, after data processor 760 performs action classification and time segmentation 440 on various signals of the input aggregated sensor data 740, the action classified time segments 440 may be input to the user interface 770 for filtering 502.

In particular embodiments, the user interface 770 may display a video of activity and allow the user to select various action filters to view and select actions and/or events in the video. As used herein, "action filters" may be described as a filter that may be applied to a video within the UI 770 of the present platform such that only portions of the video data 350 that are associated with the user specified action may be retrieved. As an example and not by way of limitation, while reviewing a video of a basketball game on the present platform, the user may apply the "shot" filter to isolate only portions of the video data 350 in which the player being filmed and wearing the wearable sensor recording device performed the action of "shooting the basketball." In this example, in a scenario where a user played sixty minutes of basketball and performed ten shots, applying the "shot" action filter may isolate the ten specific moments from the hour long video in which the user performed basketball shots.

In particular embodiments, one or more action filters may be combined. For example, if a user performed the action of skiing, the user may select multiple filters within the UI 770 of the present platform such as "jump" and "fastest" to filter portions of the video and isolate clips in which the user performed a jump and/or skied the fastest. The present disclosure contemplates any suitable method of combining filters.

Figure 8:
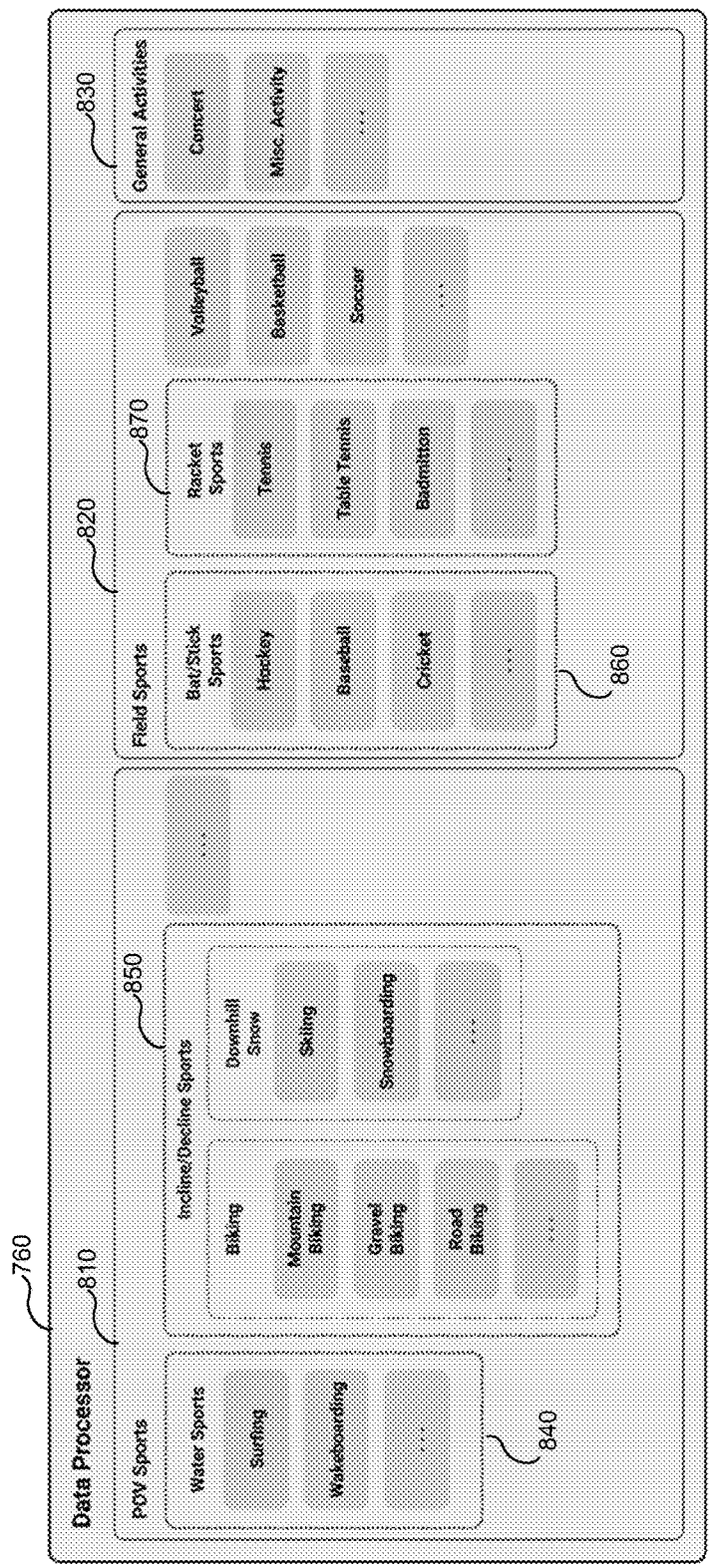
FIG. 8 illustrates an example diagram of a data processor for video event segmentation using non-image-based signals.

FIG. 8 illustrates an example diagram 800 of a data processor 760 for video event segmentation using non-image-based signals. As demonstrated by FIG. 8, diagram 800 displays a data processor class and the inheritance structure for subclasses of the data processor class as used in object-oriented programming. Although an object-oriented approach is outlined here it is not required and any other method for programming a library of one or more data processors is acceptable. FIG. 8 may also be interpreted as the data processor library that shows the available data processors and the relationship between the similar data processors. This invention provides action/event recognition for various activities in an efficient way by taking advantage of the similarities of different sports and the common actions between them, such as swings, jumps, crashes, going downhill, etc. Some differences between similar but distinct sports might be the noise or magnitude of peaks, but by using DSP filtering and normalization, among other techniques, we can use a shared data processor with different preprocessing steps, initialization parameters, etc. In particular embodiments the present platform may access a data processor library as in step 410 and use activity metadata, such as activity type, to select a relevant data processor as in step 420 for processing one or more signals of sensor data 360. The present platform may input aggregated sensor data 740 into the data processor 760 for the performance of sensor fusion, DSP filtering, and segmentation and classification of various signals of sensor data 360. FIG. 8 demonstrates an example of the relationships or class inheritance structure (as used in object-oriented programming) between different activities.

The structure of diagram 800 allows for a generalized approach where common elements may be shared between similar sports and/or activities. For example, diagram 800 demonstrates the hierarchical relationship of classes of activity. For example, under the base data processor 750 are classes of activity such as point-of-view (POV) sports 810, field sports 820, and general activities 830. As used herein, POV sports may refer to sports where a user may mount the primary video recording device to the user's body. As an example and not by way of limitation, point-of-view (POV) sports 810 may include water sports 840 and incline/decline sports 850. As another example and not by way of limitation, field sports 820 may include bat/stick sports 860 (e.g., hockey, baseball, cricket), and racket sports 870 (e.g., tennis, table tennis, badminton). These sports may be grouped together because of the overlap of the activities and the actions within them. For example, skiing and snowboarding have similarities in uphill, downhill, and lift sections, as well as jumps, tricks, crashes, and slalom. There may also be similarities to road, gravel, and mountain biking which similarly have uphill and downhill sections, potential crashes, jumps, and/or tricks. As an example and not by way of limitation, the present platform may select similar data processors to classify actions and/or event within the specific activity, where differences between activities may be indicated by noise or peak magnitude within the signals through DSP filtering and/or normalization.

In particular embodiments, one or more data processors 760 from the data processor library 410 may identify general activities 830 (e.g., concerts, miscellaneous activities). As an example and not by way of limitation, content such as video and still images may be collected an accumulated through crowdsourcing of people who attended a concert. The present platform may capture users' dancing, jumping, resting, clapping, and other activities to generate segmented information. In this example, content may be captured by multiple user devices and provide footage at various angles, locations, and viewpoints. The content may then be aggregated on the present platform and available for a user to view, download, and create a storyboard through filtering preferences based on the segmented information. As another example and not by way of limitation, gatherings of various sorts (e.g., birthday parties, weddings, graduation, etc.) may be recorded through one or more primary recording devices, wherein moments are captured and segmented by the present platform into categories (e.g., children running, indoor games, outdoor games, etc.), where users are further able to manually tag, filter, review, and share content through any digital format.

As another example and not by way of limitation, real estate may be a specific activity. In this example, a user may record a walkthrough of a home and manually tag items (e.g., lighting, door, window, etc.). This may allow users to filter and view objects within the video recording. Further, the present platform may recognize and collect the location, altitude, and dimensions of the space so users may compare various spaces. As another example and not by way of limitation, construction may be a specific activity. In this example, as developers and architects record the process of design and/or construction, they may generate a history of the end-to-end process. For example, sensors 108 may be integrated into construction tools and vehicles, the tools and vehicles may provide a log of how and when they were used. Additional information may be manually tagged (e.g., framing, drywall, plumbing) and combined with the automatically generated data, in which users may filter, sort, and share content.

Figure 9:
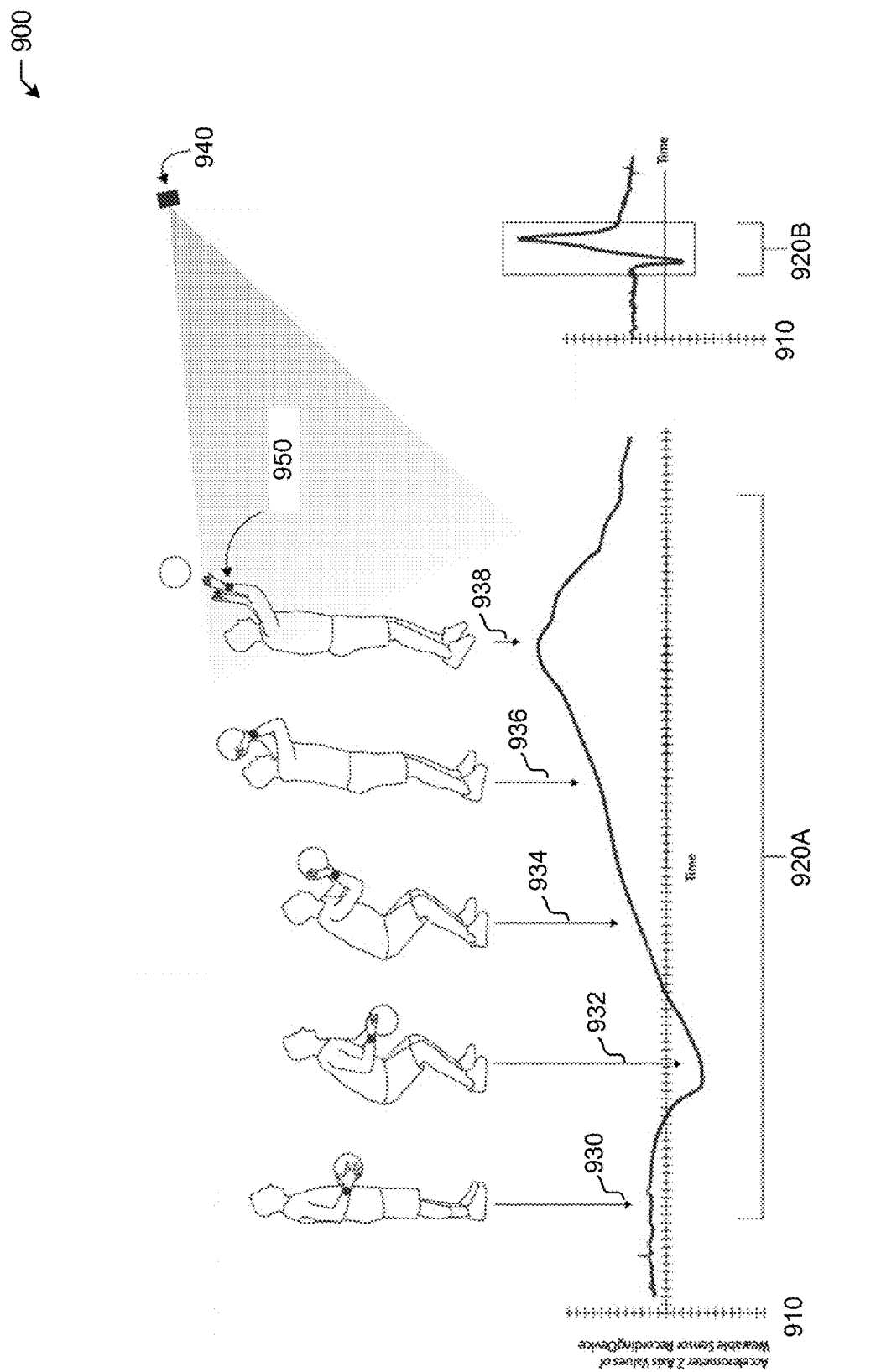
FIG. 9 illustrates an example diagram of a user performing an activity where a primary video recording device is located in a position other than on the body of a user.

FIG. 9 illustrates an example diagram 900 of a user performing an activity where a primary video recording device 940 is located in a position other than on the body of a user. In particular embodiments, the primary video recording device 940 may be located in "third person mode," where the primary video recording device 940 is located in a position other than the body of the user. As used herein, "third-person mode" refers to the recording mode in which the primary video recording device 940 is not mounted on the user and instead is recording the user from a distance. In this example, the primary video recording device 940 is unable to perform useful sensor data recording, as the sensors 108 of the primary video recording device 940 are not located on the user. In this case, the user may be required to wear a wearable sensor recording device 950 to capture sensor data 360 useful for video event segmentation and classification using non-image-based signals.

In this example, the user may be wearing a wearable sensor recording device 950, wherein axis 910 measures accelerometer z-axis vales of the wearable sensor recording device 950. As an example and not by way of limitation, the 1D accelerometer z-axis signal measured over the time axis 920A is the signal from the accelerometer in the user's wearable sensor recording device 950. As demonstrated, the non-image-based sensor signal expresses distinctive characteristics or signals of specific motions within the context of playing basketball. As used herein, "distinctive signal" may refer to a signal associated with a specific action. For example, if the user were to identify the activity to be performed as basketball, the present platform may be trained to identify general actions such as playing and not-playing (when the user is sitting on the bench), as well as more specific actions such as taking shots, making passes, dribbling, etc. In particular embodiments, the present platform may receive input from the user specifying the activity from a plurality of activities. In particular embodiments, when the specific activity being performed and filmed is not known by the present platform, the platform may classify distinctive signal characteristics as a generic action of interest. For example, a large spike in one or more of the sensor logs may indicate a moment of interest for the user to review, regardless of whether or not the platform is informed as to what activity is being performed. As another example and not by way of limitation, the present platform may review logs of one or more signals to identify any signal characteristics that differ from the average signal. The present disclosure contemplates any suitable way of classifying a segment of the signal as distinctive and of interest as compared to the entirety of the signal data.

In particular embodiments, at position 930, where the user is standing in a stationary position, the accelerometer signal may reflect little upward or downward motion. When the user is crouched, as in position 932, the accelerometer data may reflect a negative change on axis 910. As a further example, at positions 934, 936, and 938, the accelerometer data may be processed to determine that the signal represents a jump-shot. In particular embodiments, time 920A may be visually scaled down, reflecting the time axis 920B, which may illustrate the signal within the time window of the shot as compared to the rest of the signal.

Upon completion of the activity, and the data has been processed by the data processor 760, the user may review footage in the present platform and the UI of the present platform may enable the user to select one or more action filters. For example, if the user selects the "shot" action filter, a series of video clips may be generated containing video footage at the time a shot was taken during the game. In this example, if the user took six shots during the game, the shots filter may produce six clips as a result. In particular embodiments, the location of these clips on the video timeline may be visualized in the UI of the present platform so the user may select clips to review. Further, the UI of the present platform may enable the user to add one or more clips to the storyboard to rearrange and edit selected clips.

Figure 10:
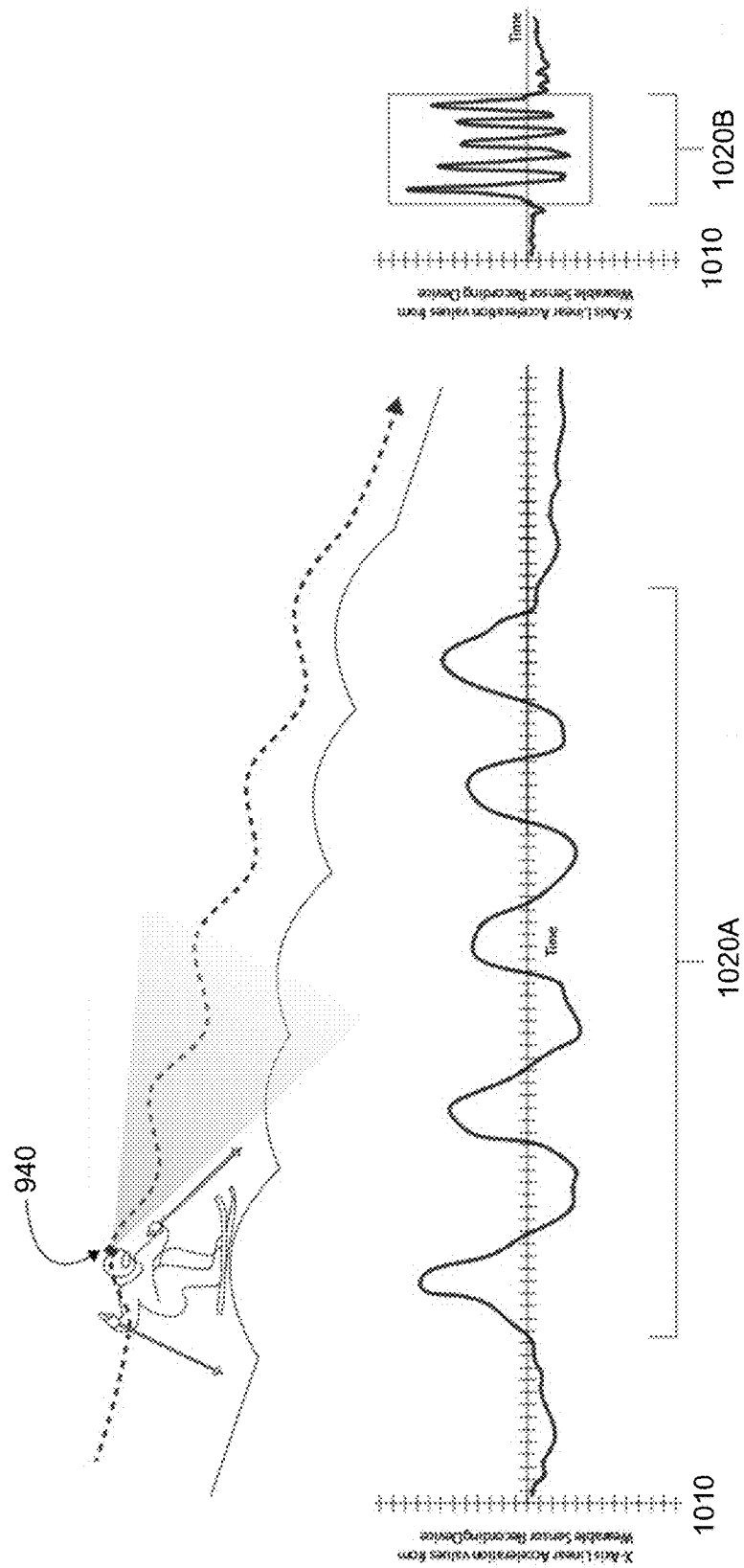
FIG. 10 illustrates an example diagram of a user performing an activity where the primary video recording device is located in point-of-view (POV) mode.

FIG. 10 illustrates an example diagram 1000 of a user performing an activity where the primary video recording device 940 is located in point-of-view (POV) mode. As used herein, "POV mode" may refer to the recording mode in which the primary or secondary video recording device is mounted on the user. In some cases, the primary video recording device may be the device in which both video and sensor data originate. In this example, because the primary video recording device 940 and sensors 108 are co-located in the same device, the user is not required to wear a wearable sensor recording device 950 for the present platform to perform event segmentation. In this example, one or more sensors 108 of the primary video recording device 940 may record linear acceleration values in the x-axis 1010 while a user skis across moguls. As an example and not by way of limitation, the present platform may determine the type of skiing the user is performing due to the distinctive signal characteristics the terrain causes one or more sensors 108 of the primary video recording device 940 to record as the user moves across the moguls. As demonstrated, the non-image-based sensor signal expresses distinctive characteristics or signals of specific motions (e.g., skiing moguls) within the context of downhill skiing over the time axis 1020A. In particular embodiments, the time axis 1020A may be visually scaled down to time axis 1020B to illustrate the unique signal collected by sensors 108 of the primary video recording device 940 while the user is skiing moguls as compared to the rest of the signal.

Figure 11:
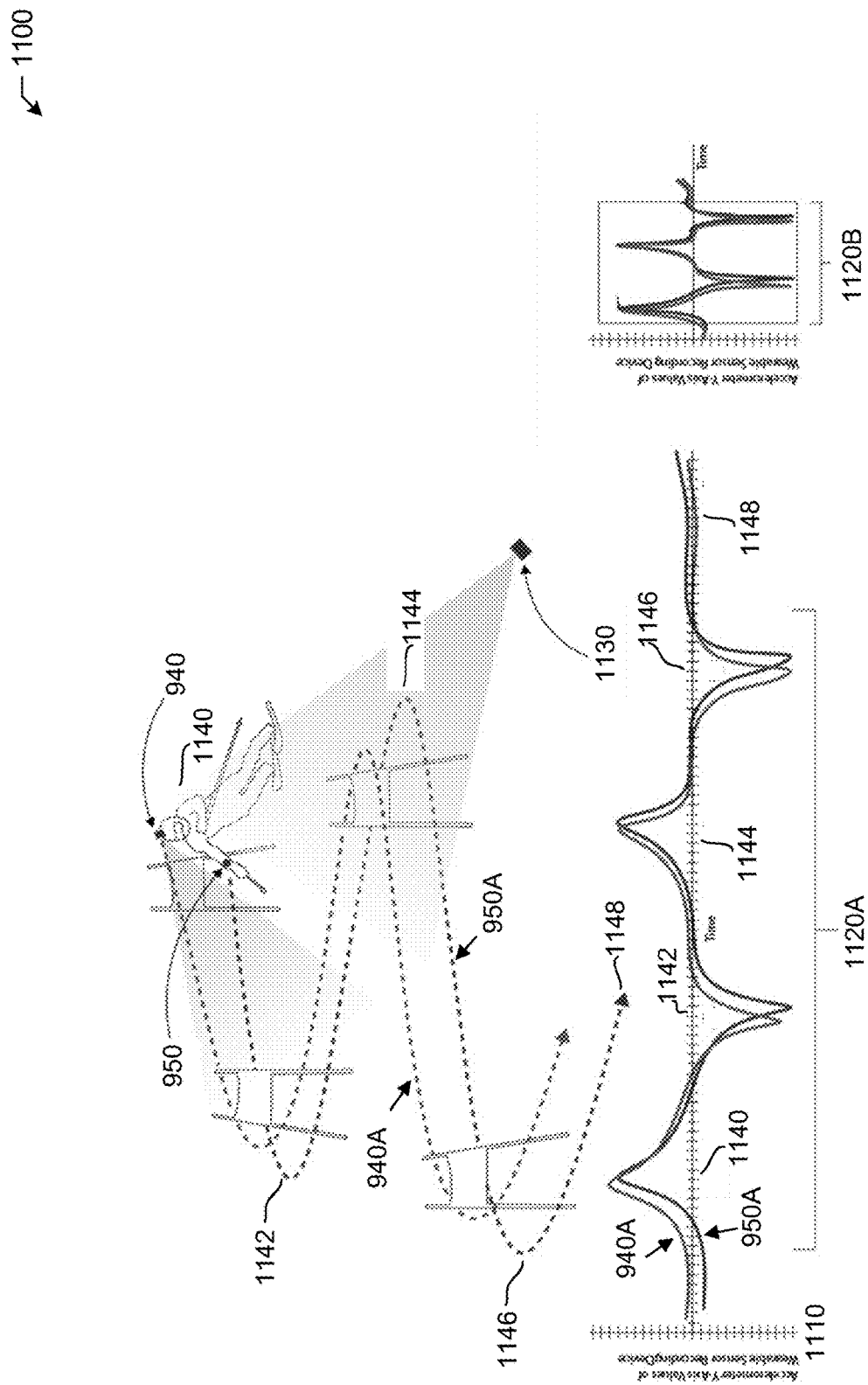
FIG. 11 illustrates an example diagram of a user performing an activity where the primary video recording device is located in POV mode in addition to the user wearing a wearable sensor recording device.

FIG. 11 illustrates an example diagram 1100 of a user performing an activity where the primary video recording device 940 is located in point-of-view (POV) mode in addition to the user wearing a wearable sensor recording device 950. In particular embodiments, the primary video recording device 940 may be mounted on the body of the user and film in POV mode and the wearable sensor recording device 950 may be located on the wrist of the user. In this example, both the primary video recording device 940 and the wearable sensor recording device 950 may transmit respective motion data from multiple locations on the user's body (e.g., the primary video recording device 940 mounted on the user's head, and the wearable sensor recording device 950 located on the user's wrist). In addition to the primary video recording device 940 and the wearable sensor recording device 950, additional video recording source 1130 may be located at a distance from the user, in third-person POV. In this example, video from the additional video recording source 1130 may be transmitted to the present platform, where clips from the video data 350 may be generated instead of or in addition to video data 350 from the primary video recording device 940. In this example, axis 1110 measures the accelerometer y-axis values of the wearable sensor recording device 950, over time axis 1120A. As demonstrated, the non-image-based sensor signals 940A and 950A expresses unique signals corresponding to specific slalom skiing motions at positions 1140, 1142, 1144,1146 and 1148. In particular embodiments, the present platform may visually scale down time axis 1120B to illustrate the distinctive signal characteristics during the time the user was slalom skiing as compared to the rest of the signal.

Figure 12A:
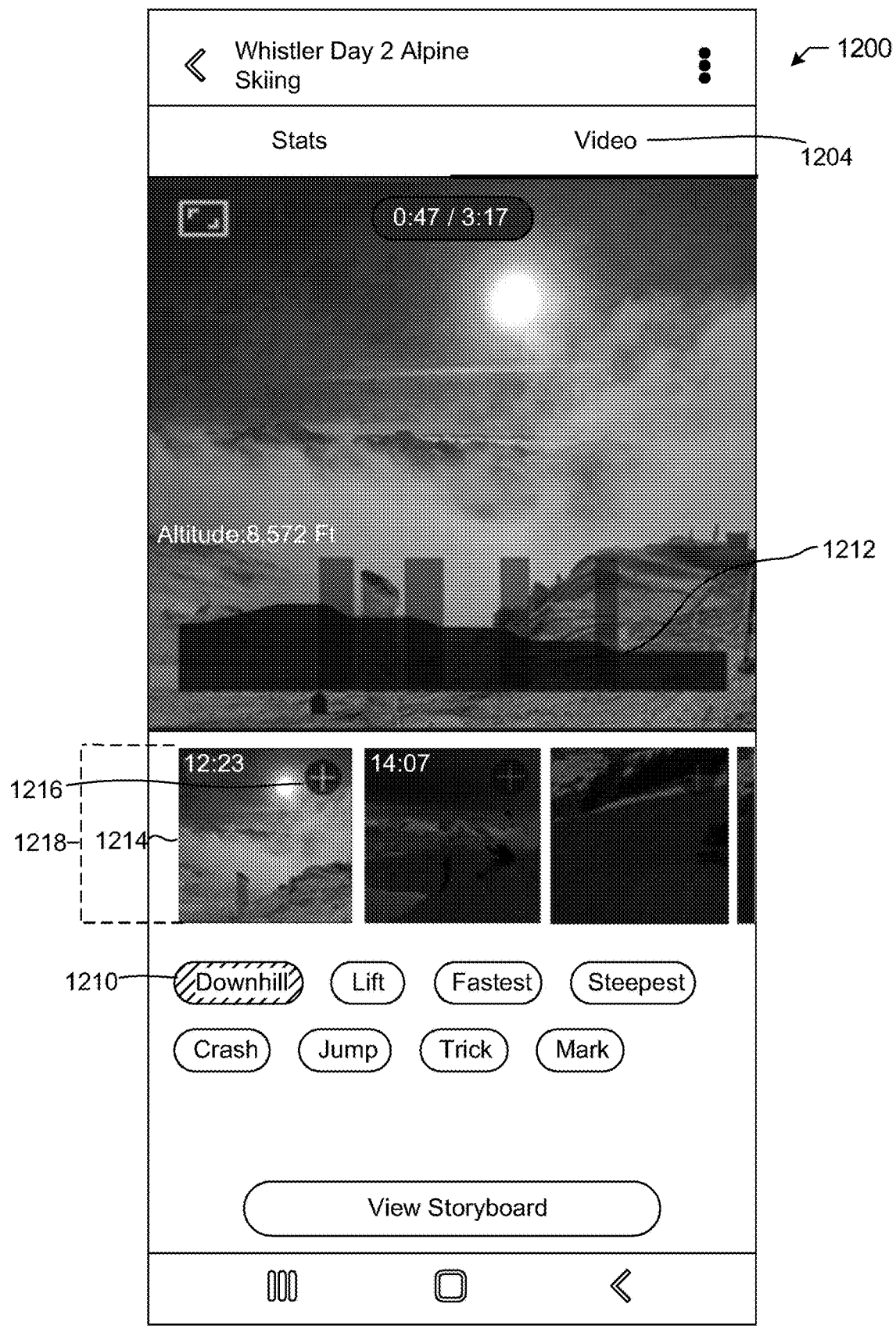
FIGS. 12A, 12B, 12C, and 12D illustrate example diagrams of user interfaces of the video event segmentation platform.

FIG. 12A illustrates an example diagram 1200 of a user interface 770 of the video event segmentation platform. Although this disclosure displays the user interface 770 in a particular manner, this disclosure contemplates a user interface in any suitable manner. In particular embodiments, electronic device 100 may provide instructions to the present platform for presenting a user interface 770 comprising one or more segments of video data. In this example, the user interface 770 may comprise one or more activatable elements for filtering the one or more segments of video data based on the one or more events associated with the respective segments of the video data.

In particular embodiments, a user may select the "video" 1204 option to review video footage of one or more activities. In particular embodiments, a single action filter may be applied, as demonstrated in FIG. 12A. In this example, the filter "downhill" 1210 may be applied, resulting in highlighted sections 1214 of the video recording that correspond to downhill 1210. In particular embodiments, the present platform may display one or more measures of sensor data 360 overlayed video footage, as demonstrated by overlay 1212. In particular embodiments, the user may scan through resulting video clips produced by the downhill 1210 filter in the horizontal bar 1218. In particular embodiments, the user may add clips to the storyboard by selecting icon 1216.

Figure 12B:
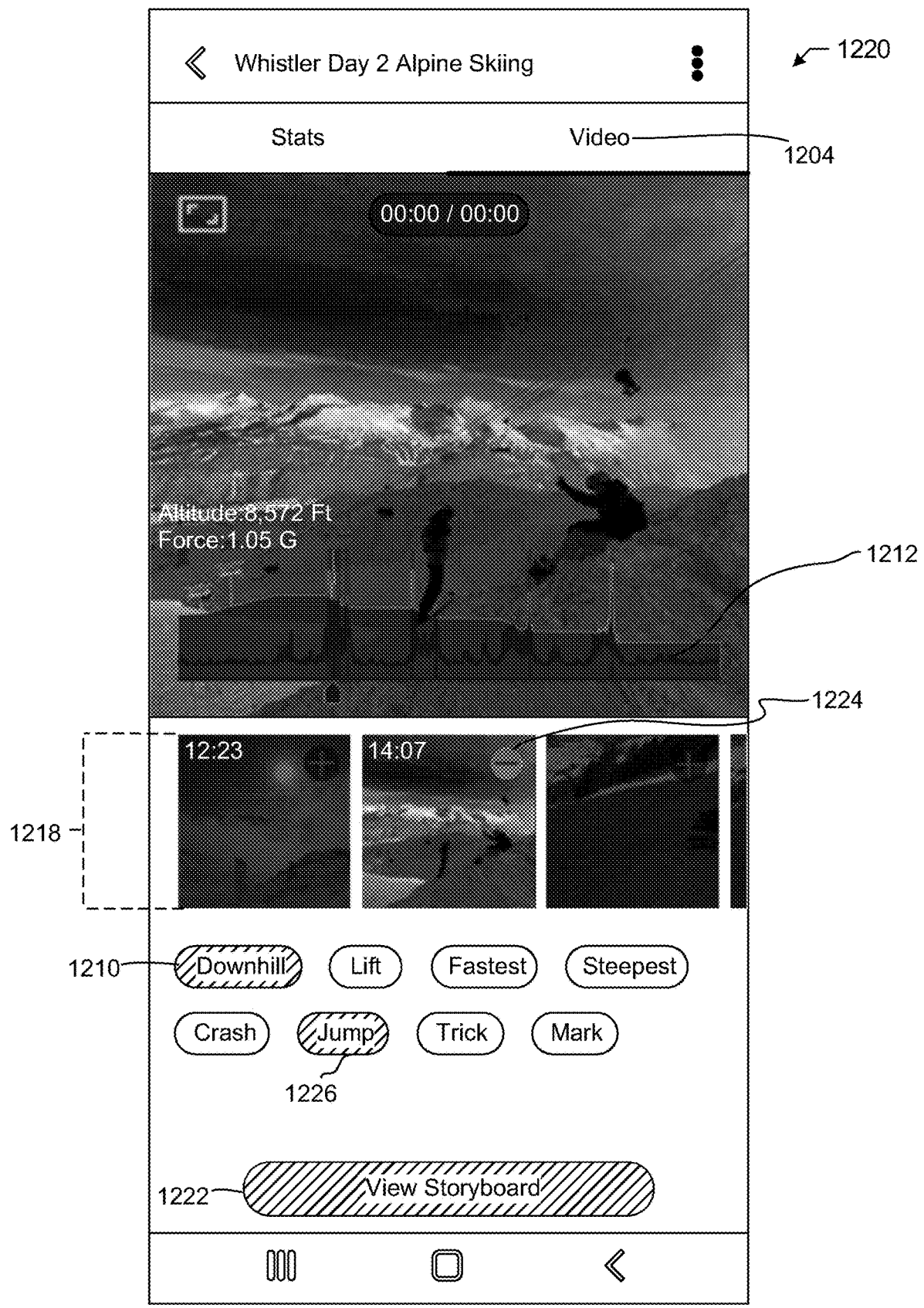

FIG. 12B illustrates an example diagram 1220 of a user interface 770 of the video event segmentation platform. In particular embodiments, a user may select the "video" 1204 option to review video footage of one or more activities. In particular embodiments, the user may combine two or more action filters, such as "downhill" 1210 and "jump" 1226 as displayed. As an example and not by way of limitation, one or more sections of the video recording corresponding to the filters downhill 1210 and jump 1222 may be highlighted in horizontal bar 1218. In particular embodiments, the one or more indications of sensor data 360 may be displayed either together or independently over one or more video clips in overlay 1212. In particular embodiments, the user may remove one or more clips that were previously selected by the user from the storyboard by selecting icon 1224. In particular embodiments, the user may select an option to view the user's storyboard 1222.

Figure 12C:
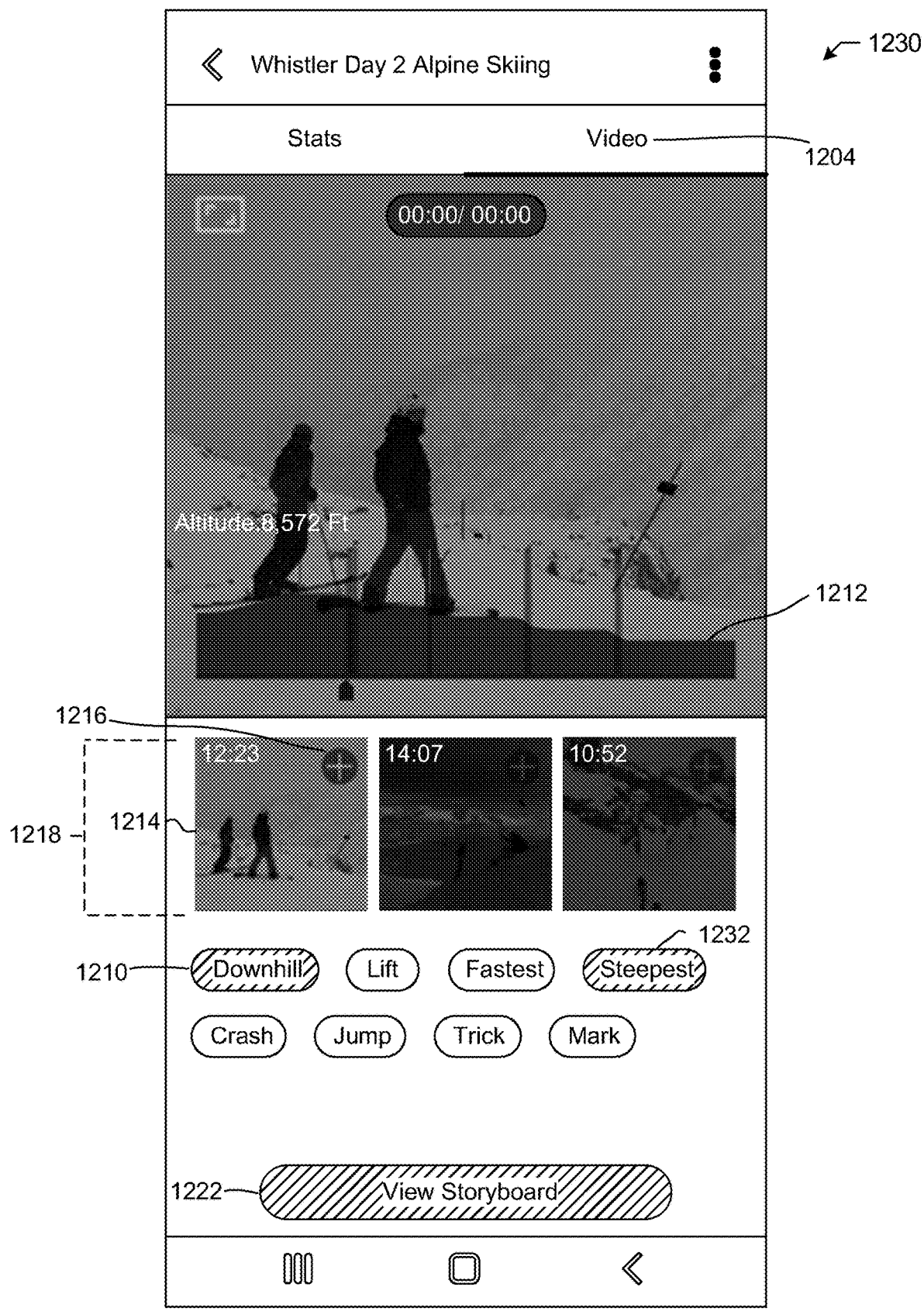

FIG. 12C illustrates an example diagram 1230 of a user interface 770 of the video event segmentation platform. In particular embodiments, a user may select the "video" 1204 option to review video footage of one or more activities. Similar to FIG. 12B, the user may combine more than one action filter, such as "downhill" 1210 and "steepest" 1232 as displayed. As an example and not by way of limitation, one or more sections of the video recordings corresponding to the filters downhill 1210 and steepest 1232 may be highlighted in horizontal bar 1218, wherein the user may add clips to the storyboard by selecting icon 1216. In particular embodiments, the present platform may display one or more measures of sensor data 360 overlayed video footage, as demonstrated by overlay 1212. In particular embodiments, the user may select an option to view the user's storyboard 1222.

Figure 12D:
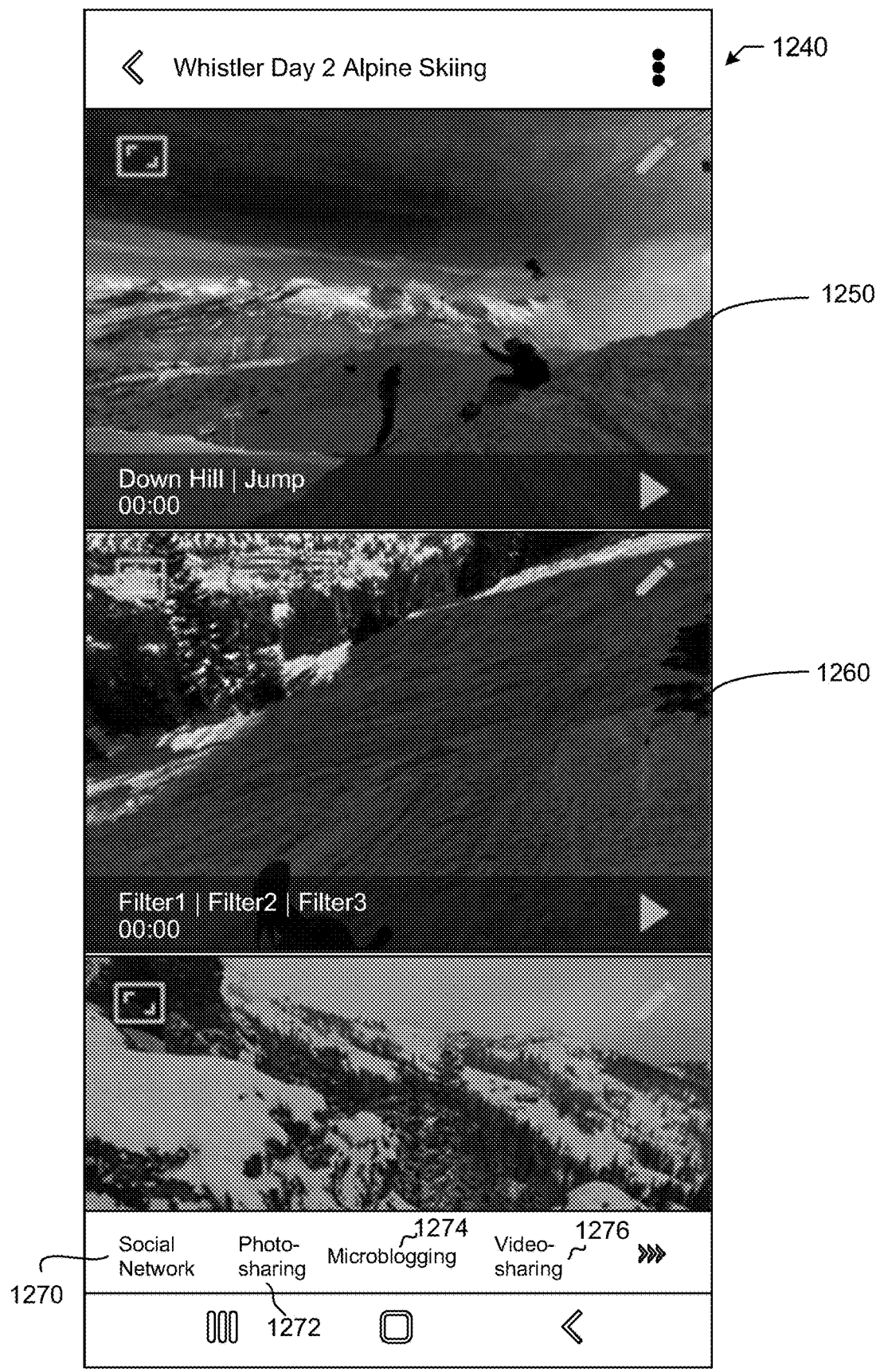

FIG. 12D illustrates an example diagram 1240 of a user interface 770 of the video event segmentation platform. In particular embodiments, in the storyboard UI, the present platform may display video clips corresponding to clips that the user selected during the filtering stage, and which may be shared with one or more external platforms. As an example and not by way of limitation, each video clip in the storyboard may correspond to one or more filters, and each video clip may correspond to the same or different filters from one another. As an example and not by way of limitation, video clips corresponding to the activity filters of downhill 1210 and jump 1226 may be compiled into video 1250, where the user may review, edit, and or/share video 1250 with one or more external platforms such as a social network 1270, photo-sharing platform 1272, microblogging platform 1274, and/or video sharing platform 1276. As another example and not by way of limitation, video 1260 may be compiled by the user selecting one or more activity filters, adding one or more clips from those filters, deselecting activity filters, and/or adding new activity filters to review. At each stage of filtering, the user may select clips to add to the storyboard, wherein the user may review, edit, and/or share the compilation of clips as a single video 1260 with one or more external platforms such as a social network 1270, photo-sharing platform 1272, microblogging platform 1274, and/or video sharing platform 1276.

Figure 13A:
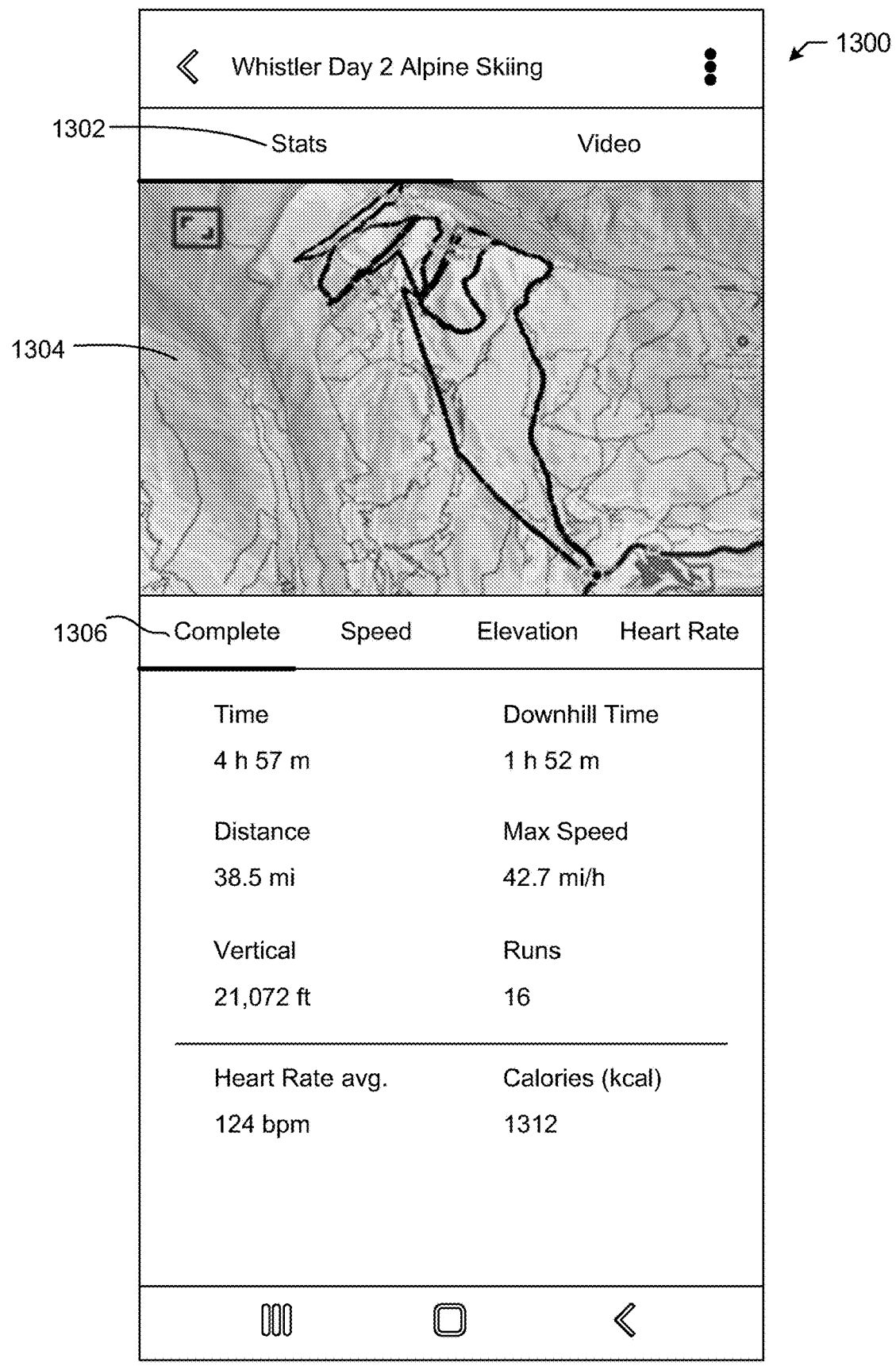
FIGS. 13A, 13B, 13C, and 13D illustrate example diagrams of user interfaces of the video event segmentation platform.

FIG. 13A illustrates an example diagram 1300 of a user interface 770 of the video event segmentation platform. In particular embodiments, a user may select the "stats" 1302 option to review statistics of sensor data 360 collected during the activity. In this example, a map 1304 generated by GPS and/or location data from one or more sensors 108 of the primary recording device 940 and/or the wearable sensor recording device 950 may be presented for display to the user. In particular embodiments, the user may select the "complete" 1306 option to review statistics of sensor data 360 recorded by the primary recording device 940 and/or wearable sensor recording device 950 such as overall time, downhill time, distance, speed, altitude, vertical, runs, heart rate, and calories.

Figure 13B:
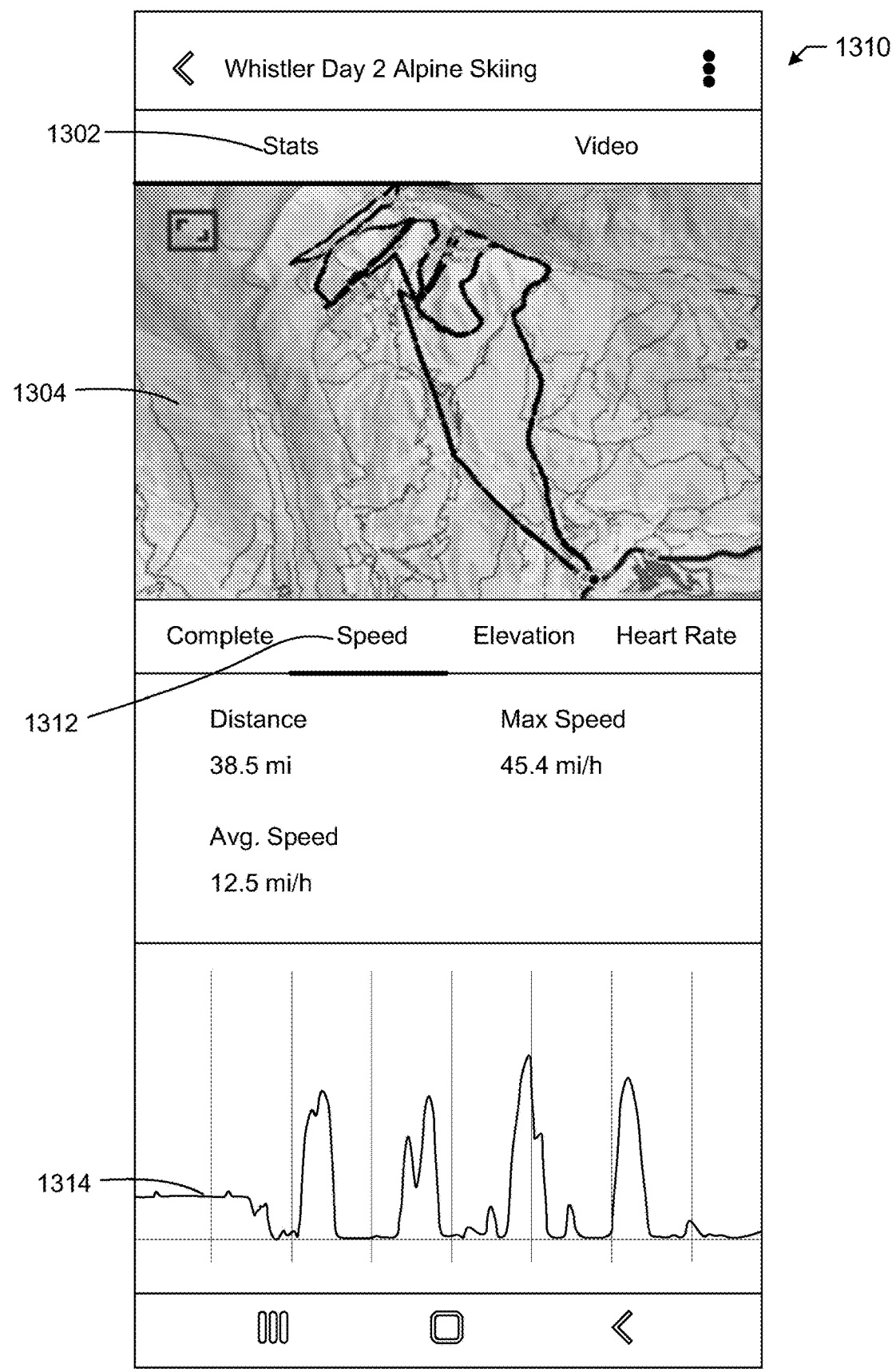

FIG. 13B illustrates an example diagram 1310 of a user interface 770 of the video event segmentation platform. In particular embodiments, a user may select the "stats" 1302 option to review statistics of sensor data 360 collected during the activity. In this example, a map 1304 generated by GPS and/or location data from one or more sensors 108 of the primary recording device 940 and/or the wearable sensor recording device 950 may be presented for display to the user. In particular embodiments, the user may select the "speed" 1312 option to review statistics of sensor data 360 recorded by the primary recording device 940 and/or wearable sensor recording device 950 related to speed during the activity. As an example and not by way of limitation, speed 1312 may include distance, a maximum speed, a minimum speed, an average speed, and/or other speed related sensor data 360. In particular embodiments, a graph 1314 corresponding to speed 1312 statistics may be generated for display by the user.

Figure 13C:
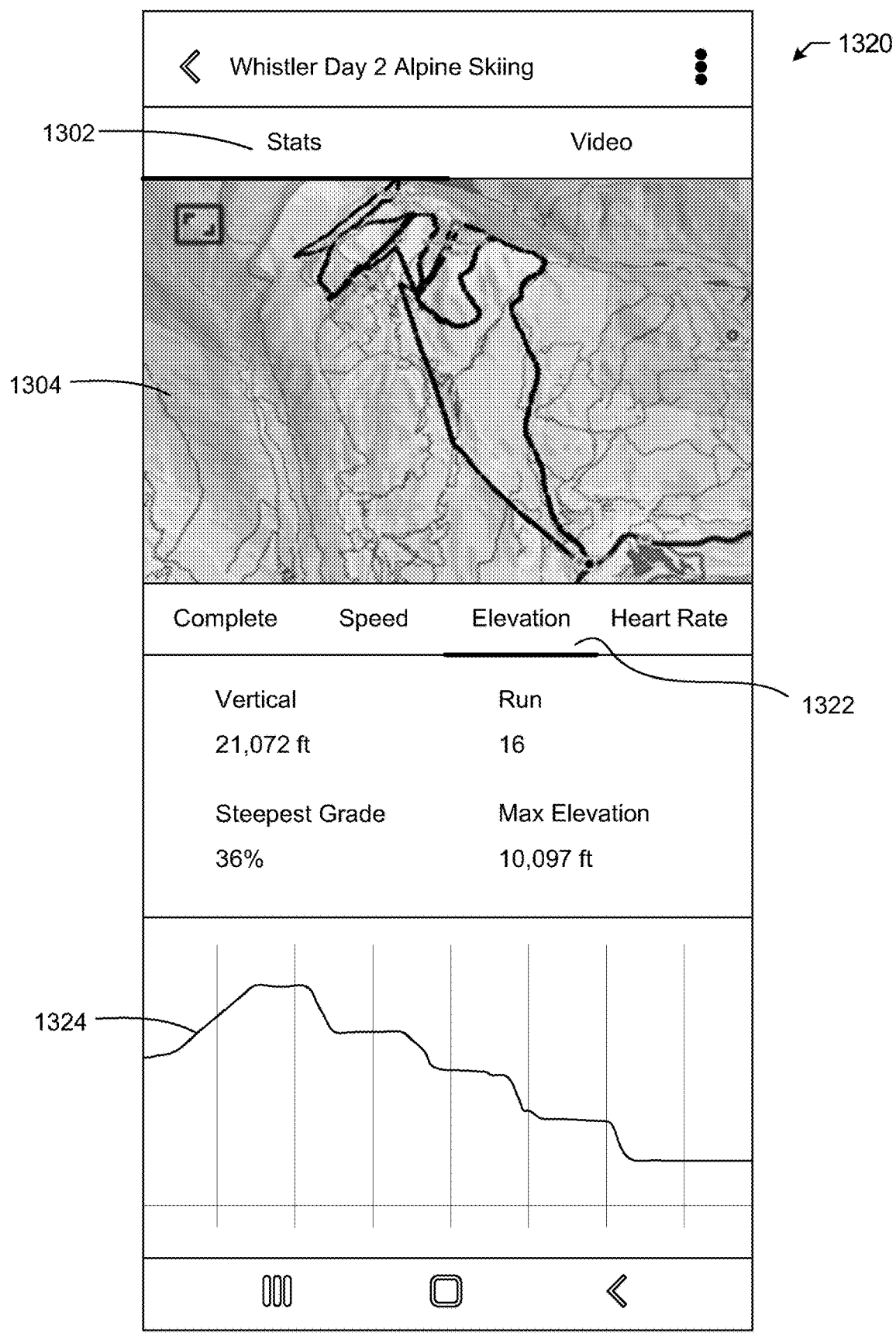

FIG. 13C illustrates an example diagram 1320 of a user interface 770 of the video event segmentation platform. In particular embodiments, a user may select the "stats" 1302 option to review statistics of sensor data 360 collected during the activity. In this example, a map 1304 generated by GPS and/or location data from one or more sensors 108 of the primary recording device 940 and/or the wearable sensor recording device 950 may be presented for display to the user. In particular embodiments, the user may select the "elevation" 1322 option to review sensor data 360 recorded by the primary recording device 940 and/or wearable sensor recording device 950 related to elevation during the activity. As an example and not by way of limitation, sensor data 360 related to elevation may include an indication of vertical feet travelled, grade, maximum elevation, minimum elevation, and run count and/or any suitable elevation data. In particular embodiments, a graph 1324 corresponding to elevation 1322 statistics may be generated for display by the user.

Figure 13D:
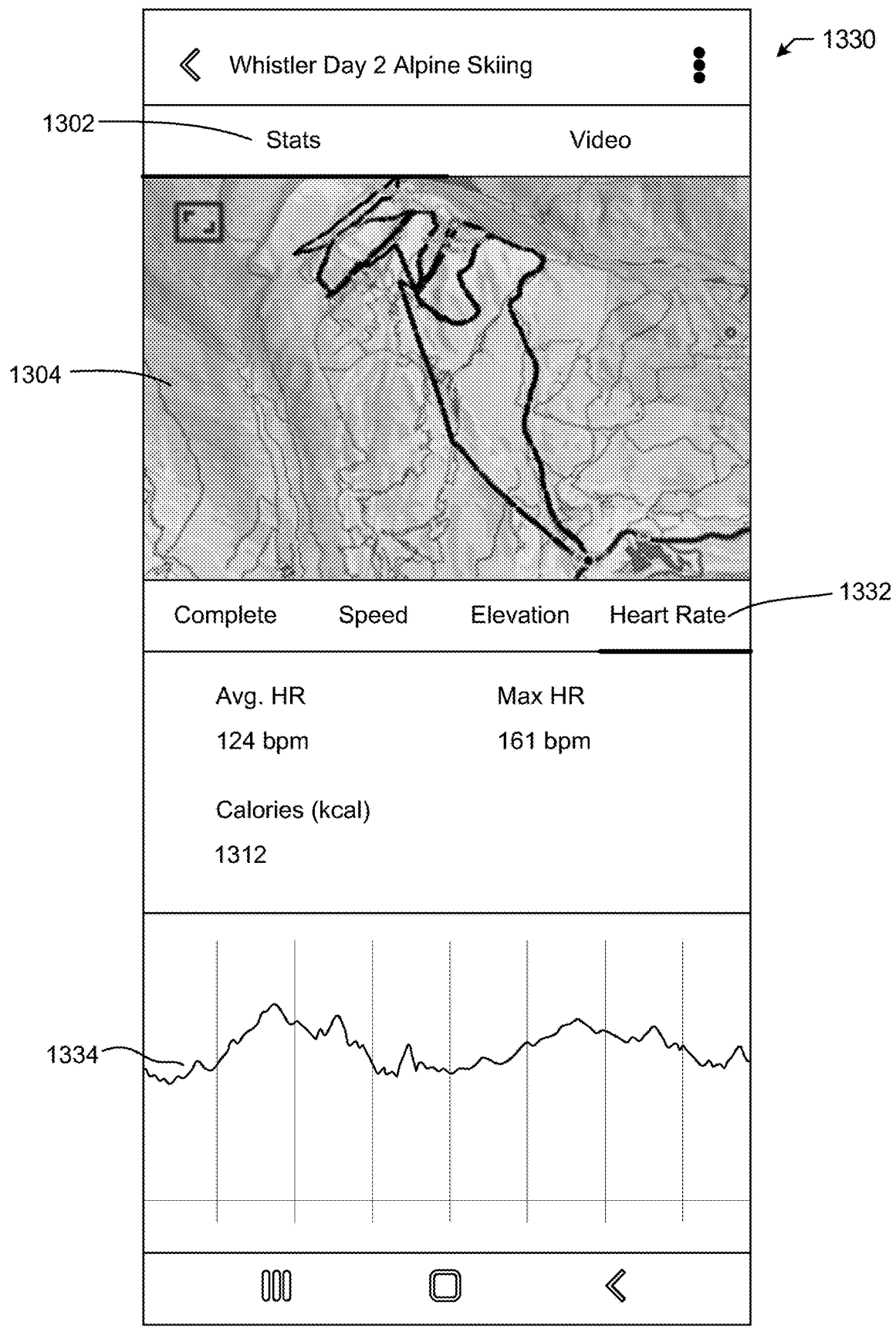

FIG. 13D illustrates an example diagram 1330 of a user interface 770 of the video event segmentation platform. In particular embodiments, a user may select the "stats" 1302 option to review statistics of sensor data 360 collected during the activity. In this example, a map 1304 generated by GPS and/or location data from one or more sensors 108 of the primary recording device 940 and/or the wearable sensor recording device 950 may be presented for display to the user. In particular embodiments, the user may select the "heart rate 1332 option to review sensor data 360 recorded by the primary recording device 940 and/or wearable sensor recording device 950 related to a user's heart rate during the activity. As an example and not by way of limitation, sensor data 360 related to the user's heart rate may include an indication of a minimum heart rate, maximum heart rate, average heart rate, calories burned, and/or any suitable heart rate data. In particular embodiments, a graph 1334 corresponding to heart rate 1332 statistics may be generated for display by the user.

Figure 14:
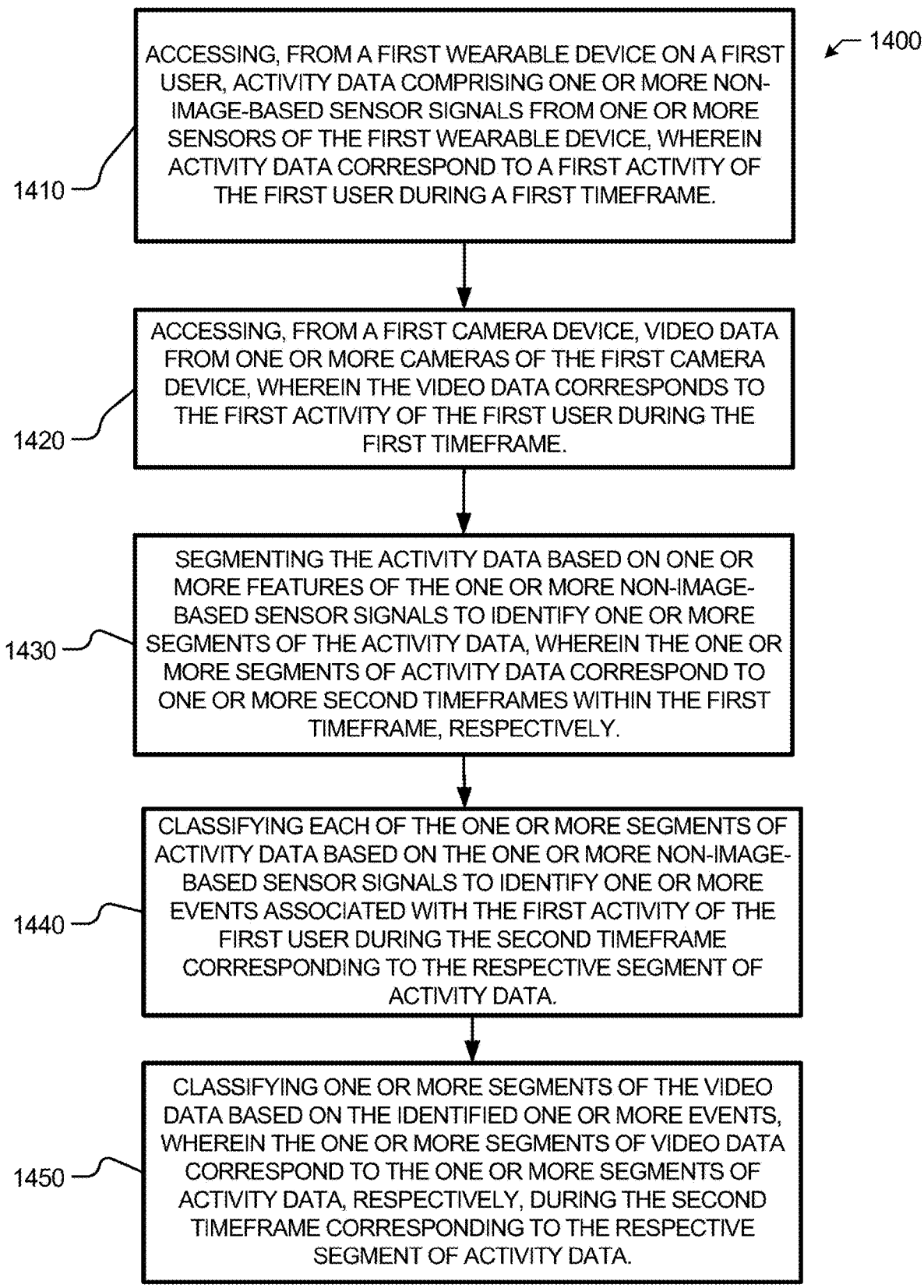
FIG. 14 illustrates a flow diagram of a method for video event segmentation derived from simultaneously recorded non-image-based sensor data.

FIG. 14 illustrates a flow diagram 1400 of a method for video event segmentation derived from simultaneously recorded non-image-based sensor data 360. The method 1400 may be performed utilizing one or more electronic devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1400 may begin at step 1410 with the present platform accessing, from a first wearable device on a first user, activity data comprising one or more non-image-based sensor signals from one or more sensors 108 of the first wearable device. As an example and not by way of limitation, the activity data may correspond to a first activity of a first user during a first timeframe. For example, in particular embodiments, the method 1400 may then continue at step 1420 with the present platform accessing, from a first camera device video data 350 from one or more cameras of the first camera device, wherein the video data 350 corresponds to the first activity of the first user during the first timeframe. The method 1400 may then continue at step 1430, wherein one or more data processors 760 of the present platform may segment the activity data based on one or more features from the one or more non-image-based sensor signals to identify one or more segments of the activity data. As an example and not by way of limitation, the one or more segments of activity data may correspond to one or more second timeframes within the first timeframe, respectively.

The method 1400 may continue at step 1440, wherein one or more data processors 760 of the present platform may classify each of the one or more segments of activity data based on the one or more non-image-based signals to identify one or more events associated with the first activity of the first user during the second timeframe corresponding to the respective segment of activity data. The method 1400 may then continue at step 1450, wherein one or more data processors 760 of the present platform may classify one or more segments of the video data 350 based on the identified one or more events. As an example and not by way of limitation, the one or more segments of video data 350 may correspond to the one or more segments of activity data during the second timeframe corresponding to the respective segment of activity data. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for video event segmentation, including the particular steps of the method of FIG. 14, this disclosure contemplates any suitable method for video event segmentation derived from simultaneously recorded sensor data, including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Systems and Methods

Figure 15:
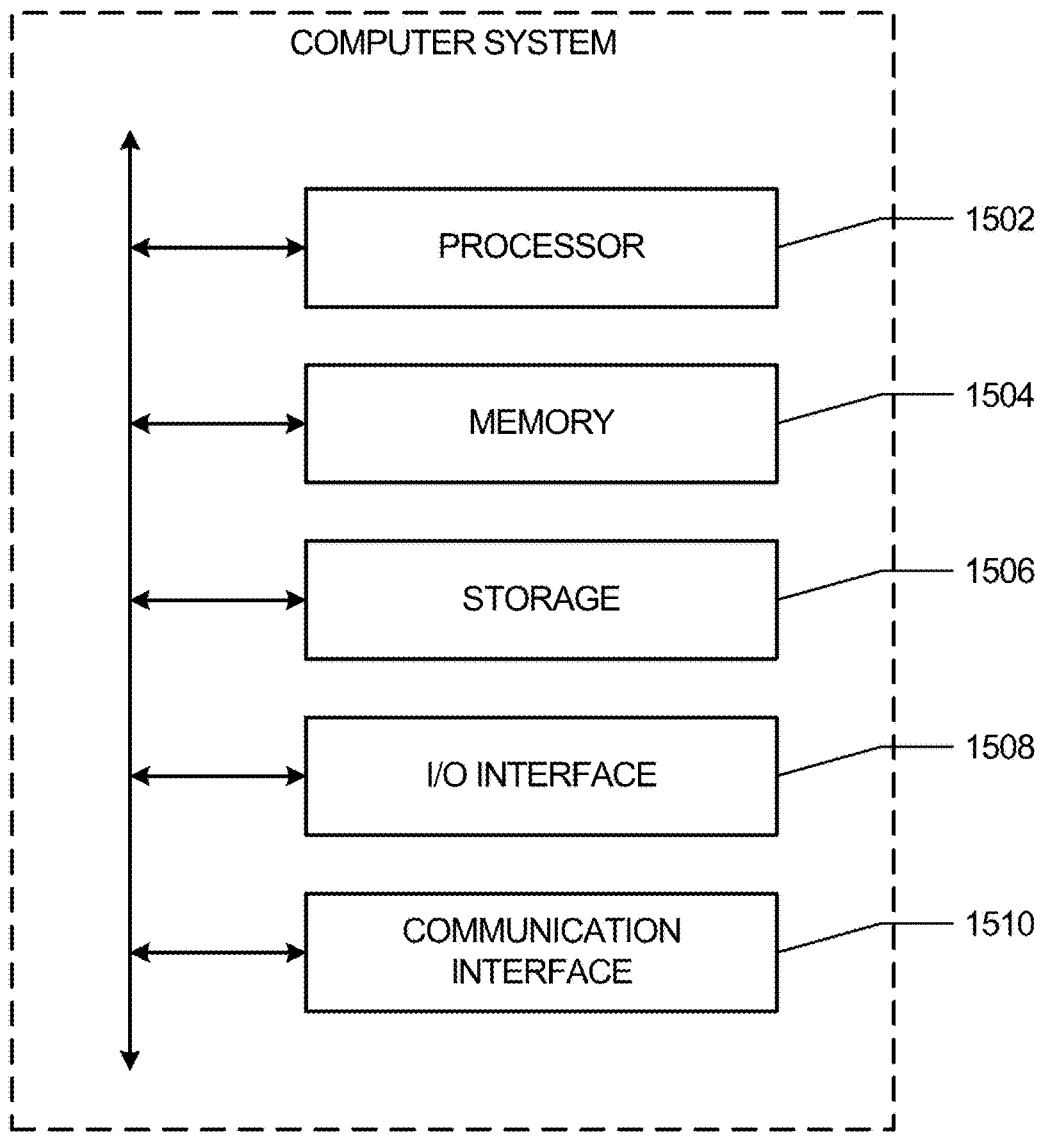
FIG. 15 illustrates an example computer system.

FIG. 15 illustrates an example computer system 1500 that may be utilized to perform video event segmentation derived from simultaneously recorded sensor data, in accordance with the presently disclosed embodiments. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks.

Where appropriate, one or more computer systems 1500 may perform without substantial spatial or temporal limitation one or more steps of one or more methods described or illustrated herein. As an example, and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement. In particular embodiments, processor 1502 includes hardware for executing instructions, such as those making up a computer program. As an example, and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example, and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502.

Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example, and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere).

One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memory devices 1504, where appropriate. Although this disclosure describes and illustrates particular memory, this disclosure contemplates any suitable memory.

In particular embodiments, storage 1506 includes mass storage for data or instructions. As an example, and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1506 for them. Where appropriate, I/O interface 1508 may include one or more device or software drivers enabling processor 1502 to drive one or more of these I/O devices. I/O interface 1508 may include one or more I/O interfaces 1506, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it.

As an example, and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example, and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
    accessing, from a first wearable device on a first user, one or more non-image-based sensor signals from one or more sensors of the first wearable device, wherein the one or more non-image-based sensor signals correspond to a first timeframe;
    identifying a first activity of the first user during the first timeframe based on a characteristic activity signature associated with the one or more non-image-based sensor signals over the first time period;
    accessing, from a first camera device, video data from one or more cameras of the first camera device, wherein the video data corresponds to the first activity of the first user during the first timeframe;
    segmenting the one or more non-image-based sensor signals corresponding to the first timeframe into a plurality of segments, wherein each segment corresponds to one or more second timeframes within the first timeframe, respectively;
    automatically classifying each segment, based on (1) the identified first activity and (2) the one or more non-image-based signals of that segment, to identify one or more events within the first activity of the first user during the second timeframe corresponding to the respective segment; and
    classifying one or more segments of the video data based on the identified one or more events, wherein each segment of video data corresponds to the one or more segments of the one or more non-image-based sensor signals, respectively, during the second timeframe corresponding to the respective segment of sensor signals.

2. The method of claim 1, further comprising:
    aligning the one or more non-image-based sensor signals over the first time period and the video data based on one or more of timestamps, audio elements, visual elements, or sensor signal elements.

3. The method of claim 1, further comprising:
    determining the first activity from a plurality of activities based on the one or more non-image-based sensor signals.

4. The method of claim 3, wherein the first activity is further determined based on one or more of a global positioning system (GPS) location, a date, a time, a temperature, or a previous activity.

5. The method of claim 1, wherein the first activity is selected from a plurality of hierarchically organized activities, wherein each of the plurality of activities is associated with a respective subclass of one or more actions or one or more events, and wherein the identified one or more events within the first activity of the first user are selected from a subclass of one or more actions associated with the first activity.

6. The method of claim 1, further comprising:
receiving a user input specifying the first activity from a plurality of activities.

7. The method of claim 1, further comprising:
providing instructions for presenting a user interface comprising the one or more segments of the video data, wherein the user interface comprises one or more activatable elements for filtering the one or more segments of the video data based on the one or more events associated with the respective segments of the video data.

8. An electronic device comprising:
one or more displays;
one or more sensors
one or more non-transitory computer-readable storage media including instructions; and
one or more processors coupled to the storage media, the one or more processors configured to execute the instructions to:
access, from a first wearable device on a first user, one or more non-image-based sensor signals from one or more sensors of the first wearable device, wherein the one or more non-image-based sensor signals correspond to a first timeframe;
identify a first activity of the first user during the first timeframe based on a characteristic activity signature associated with the one or more non-image-based sensor signals over the first time period
access, from a first camera device, video data from one or more cameras of the first camera device, wherein the video data corresponds to the first activity of the first user during the first timeframe;
segment the one or more non-image-based sensor signals corresponding to the first timeframe into a plurality of segments, wherein each segment corresponds to one or more second timeframes within the first timeframe, respectively;
automatically classify each segment based on (1) the identified first activity and (2) the one or more non-image-based signals of that segment, to identify one or more events within the first activity of the first user during the second timeframe corresponding to the respective segment; and
classify one or more segments of the video data based on the identified one or more events, wherein each segment of video data corresponds to the one or more segments of the one or more non-image-based sensor signals, respectively, during the second timeframe corresponding to the respective segment of sensor signals.

9. The electronic device of claim 8, wherein the processors are further configured to execute instructions to:
align the one or more non-image-based sensor signals over the first time period and the video data based on one or more of timestamps, audio elements, visual elements, or sensor signal elements.

10. The electronic device of claim 8, wherein the processors are further configured to execute instructions to:
determine the first activity from a plurality of activities based on the one or more non-image-based sensor signals.

11. The electronic device of claim 10, wherein the first activity is further determined based on one or more of a global positioning system (GPS) location, a date, a time, a temperature, or a previous activity.

12. The electronic device of claim 8, wherein the first activity is selected from a plurality of hierarchically organized activities, wherein each of the plurality of activities is associated with a respective subclass of one or more actions or one or more events, and wherein the identified one or more events within the first activity of the first user are selected from a subclass of one or more actions associated with the first activity.

13. The electronic device of claim 8, wherein the processors are further configured to execute instructions to:
receive a user input specifying the first activity from a plurality of activities.

14. The electronic device of claim 8, wherein the processors are further configured to execute instructions to:
provide instructions for presenting a user interface comprising the one or more segments of the video data, wherein the user interface comprises one or more activatable elements for filtering the one or more segments of the video data based on the one or more events associated with the respective segments of the video data.

15. A non-transitory computer-readable medium comprising instructions that, when executed by one or more processors of an electronic device, cause the one or more processors to:
access, from a first wearable device on a first user, one or more non-image-based sensor signals from one or more sensors of the first wearable device, wherein the one or more non-image-based sensor signals correspond to a first timeframe;
identify a first activity of the first user during the first timeframe based on a characteristic activity signature associated with the one or more non-image-based sensor signals over the first time period
access, from a first camera device, video data from one or more cameras of the first camera device, wherein the video data corresponds to the first activity of the first user during the first timeframe;
segment the one or more non-image-based sensor signals corresponding to the first timeframe into a plurality of segments, wherein each segment corresponds to one or more second timeframes within the first timeframe, respectively;
automatically classify each segment, based on (1) the identified first activity and (2) the one or more non-image-based signals of that segment, to identify one or more events within the first activity of the first user during the second timeframe corresponding to the respective segment; and
classify one or more segments of the video data based on the identified one or more events, wherein each segment of video data corresponds to the one or more segments of the one or more non-image-based sensor signals, respectively, during the second timeframe corresponding to the respective segment of sensor signals.

16. The non-transitory computer-readable medium of claim 15, wherein the instructions further comprises instructions to:

align the one or more non-image-based sensor signals over the first time period and the video data based at least on a time stamp associated with a particular segment of activity data, audio signal, visual detection of an event, or sensor signal analysis.

17. The non-transitory computer-readable medium of claim 15, wherein the instructions further comprises instructions to:
determine the first activity from a plurality of activities based on the one or more non-image-based sensor signals.

18. The non-transitory computer-readable medium of claim 17, wherein the first activity is further determined based on one or more of a global positioning system (GPS) location, a date, a time, a temperature, or a previous activity.

19. The non-transitory computer-readable medium of claim 15, wherein the first activity is selected from a plurality of hierarchically organized activities, wherein each of the plurality of activities is associated with a respective subclass of one or more actions or one or more events, and wherein the identified one or more events within the first activity of the first user are selected from a subclass of one or more actions associated with the first activity.

20. The non-transitory computer-readable medium of claim 15, wherein the instructions further comprises instructions to:
receive a user input specifying the first activity from a plurality of activities.

* * * * *